US011012717B2

(12) United States Patent
Ye et al.

(10) Patent No.: US 11,012,717 B2
(45) Date of Patent: *May 18, 2021

(54) CODEC ARCHITECTURE FOR MULTIPLE LAYER VIDEO CODING

(71) Applicant: Vid Scale, Inc., Wilmington, DE (US)

(72) Inventors: Yan Ye, San Diego, CA (US); George W McClellan, Bensalem, PA (US); Yong He, San Diego, CA (US); Xiaoyu Xiu, San Diego, CA (US); Yuwen He, San Diego, CA (US); Jie Dong, San Diego, CA (US); Can Bal, San Diego, CA (US); Eun Seok Ryu, Seoul (KR)

(73) Assignee: VID SCALE, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,304

(22) Filed: Oct. 24, 2019

(65) Prior Publication Data

US 2020/0059671 A1 Feb. 20, 2020

Related U.S. Application Data

(63) Continuation of application No. 15/863,088, filed on Jan. 5, 2018, now Pat. No. 10,484,717, which is a
(Continued)

(51) Int. Cl.
*H04N 19/30* (2014.01)
*H04N 19/117* (2014.01)
(Continued)

(52) U.S. Cl.
CPC ........... *H04N 19/70* (2014.11); *H04N 19/117* (2014.11); *H04N 19/157* (2014.11); *H04N 19/30* (2014.11);
(Continued)

(58) Field of Classification Search
CPC .............................. H04N 19/70; H04N 19/117
See application file for complete search history.

(56) References Cited

U.S. PATENT DOCUMENTS

| 7,876,833 B2* | 1/2011 | Segall | H04N 19/61 375/240.24 |
| 8,054,885 B2* | 11/2011 | Jeon | H04N 19/46 375/240.16 |

(Continued)

FOREIGN PATENT DOCUMENTS

| CN | 1926873 A | 3/2007 |
| CN | 101444104 A | 5/2009 |

(Continued)

OTHER PUBLICATIONS

CN 1926873 A, US 2005/0195900 A1.
(Continued)

*Primary Examiner* — Irfan Habib
(74) *Attorney, Agent, or Firm* — Condo Roccia Koptiw LLP

(57) ABSTRACT

Systems, methods, and instrumentalities are provided to implement video coding system (VCS). The VCS may be configured to receive a video signal, which may include one or more layers (e.g., a base layer (BL) and/or one or more enhancement layers (ELs)). The VCS may be configured to process a BL picture into an inter-layer reference (ILR) picture, e.g., using picture level inter-layer prediction process. The VCS may be configured to select one or both of the processed ILR picture or an enhancement layer (EL) reference picture. The selected reference picture(s) may comprise one of the EL reference picture, or the ILR picture. The VCS may be configured to predict a current EL picture using one or more of the selected ILR picture or the EL reference
(Continued)

picture. The VCS may be configured to store the processed ILR picture in an EL decoded picture buffer (DPB).

22 Claims, 17 Drawing Sheets

Related U.S. Application Data continuation of application No. 13/937,645, filed on Jul. 9, 2013, now Pat. No. 9,998,764.

(60) Provisional application No. 61/734,264, filed on Dec. 6, 2012, provisional application No. 61/669,356, filed on Jul. 9, 2012.

(51) Int. Cl.
*H04N 19/157* (2014.01)
*H04N 19/70* (2014.01)
*H04N 19/33* (2014.01)
*H04N 19/31* (2014.01)
*H04N 19/36* (2014.01)

(52) U.S. Cl.
CPC ............ *H04N 19/31* (2014.11); *H04N 19/33* (2014.11); *H04N 19/36* (2014.11)

(56) References Cited

U.S. PATENT DOCUMENTS

| | | | | |
|---|---|---|---|---|
| 8,060,651 B2* | 11/2011 | Deshpande | ......... | H04L 47/2416 709/246 |
| 8,498,337 B2* | 7/2013 | Park | ............ | H04N 19/33 375/240.12 |
| 8,867,619 B2* | 10/2014 | Schwarz | ............. | H04N 19/61 375/240.16 |
| 8,938,004 B2* | 1/2015 | Boyce | ............. | H04N 19/70 375/240.12 |
| 8,958,477 B2* | 2/2015 | Boyce | ............. | H04N 19/174 375/240.12 |
| 9,014,494 B2* | 4/2015 | Esenlik | ............. | H04N 19/70 382/233 |
| 9,191,671 B2* | 11/2015 | Vanam | ............. | H04N 19/65 |
| 9,210,430 B2* | 12/2015 | Deshpande | ......... | H04N 19/172 |
| 9,253,233 B2* | 2/2016 | Luby | ............. | H04N 21/23439 |
| 9,253,487 B2* | 2/2016 | Seregin | ............. | H04N 19/30 |
| 9,294,776 B2* | 3/2016 | Rapaka | ............. | H04N 19/33 |
| 9,344,718 B2* | 5/2016 | Chen | ............. | H04N 19/159 |
| 9,432,667 B2* | 8/2016 | Seregin | ............. | H04N 19/52 |
| 9,516,309 B2* | 12/2016 | Rapaka | ............. | H04N 19/105 |
| 9,554,133 B2* | 1/2017 | Ye | ............. | H04N 19/162 |
| 9,554,149 B2* | 1/2017 | Kim | ............. | H04N 19/105 |
| 9,560,358 B2* | 1/2017 | Chen | ............. | H04N 19/105 |
| 9,641,851 B2* | 5/2017 | Seregin | ............. | H04N 19/50 |
| 9,648,326 B2* | 5/2017 | Chen | ............. | H04N 19/174 |
| 9,648,333 B2* | 5/2017 | He | ............. | H04N 19/46 |
| 9,648,353 B2* | 5/2017 | Pu | ............. | H04N 19/30 |
| 9,648,626 B2 | 5/2017 | Uemura et al. | | |
| 9,654,786 B2* | 5/2017 | Hendry | ............. | H04N 19/176 |
| 9,654,794 B2* | 5/2017 | Ramasubramanian | ............. | H04N 19/30 |
| 9,674,522 B2* | 6/2017 | Rapaka | ............. | H04N 19/70 |
| 9,681,145 B2* | 6/2017 | Rapaka | ............. | H04N 19/513 |
| 9,706,199 B2* | 7/2017 | Ugur | ............. | H04N 19/52 |
| 9,716,900 B2* | 7/2017 | Ramasubramanian | ............. | H04N 19/46 |
| 9,723,321 B2* | 8/2017 | Choi | ............. | H04N 19/513 |
| 9,819,947 B2* | 11/2017 | Ye | ............. | H04N 19/513 |
| 9,900,593 B2* | 2/2018 | Xiu | ............. | H04N 19/31 |
| 10,057,582 B2* | 8/2018 | Narasimhan | ......... | H04N 19/152 |
| 10,063,868 B2* | 8/2018 | Narasimhan | ............. | H04N 19/30 |
| 10,694,182 B2* | 6/2020 | Hinz | ............. | H04N 19/107 |
| 10,694,204 B2* | 6/2020 | Chen | ............. | H04N 19/503 |
| 2005/0195900 A1* | 9/2005 | Han | ............. | H04N 19/61 375/240.21 |
| 2006/0126962 A1 | 6/2006 | Sun | | |
| 2006/0133482 A1* | 6/2006 | Park | ............. | H04N 19/59 375/240.08 |
| 2006/0197777 A1 | 9/2006 | Cha et al. | | |
| 2006/0209959 A1* | 9/2006 | Sun | ............. | H04N 19/34 375/240.16 |
| 2006/0215762 A1 | 9/2006 | Han et al. | | |
| 2006/0260991 A1 | 11/2006 | Liao | | |
| 2006/0268991 A1* | 11/2006 | Segall | ............. | H04N 19/615 375/240.24 |
| 2007/0171969 A1 | 7/2007 | Han et al. | | |
| 2007/0223575 A1 | 9/2007 | Wang et al. | | |
| 2008/0165855 A1* | 7/2008 | Wang | ............. | H04N 19/176 375/240.16 |
| 2009/0010331 A1 | 1/2009 | Jeon et al. | | |
| 2010/0020871 A1* | 1/2010 | Hannuksela | ............. | H04N 19/573 375/240.12 |
| 2012/0075436 A1 | 3/2012 | Chen et al. | | |
| 2012/0269275 A1* | 10/2012 | Hannuksela | ............. | H04N 19/61 375/240.25 |
| 2013/0114735 A1* | 5/2013 | Wang | ............. | H04N 19/17 375/240.23 |
| 2013/0279576 A1* | 10/2013 | Chen | ............. | H04N 19/52 375/240.12 |
| 2014/0003504 A1* | 1/2014 | Ugur | ............. | H04N 19/167 375/240.12 |
| 2014/0010294 A1 | 1/2014 | Ye et al. | | |
| 2014/0092994 A1* | 4/2014 | Wang | ............. | H04N 19/46 375/240.26 |
| 2014/0133567 A1* | 5/2014 | Rusanovskyy | ............. | H04N 19/513 375/240.16 |
| 2014/0192881 A1* | 7/2014 | Xu | ............. | H04N 19/52 375/240.16 |
| 2014/0294081 A1* | 10/2014 | Garrido | ............. | H04N 19/51 375/240.16 |
| 2014/0301457 A1* | 10/2014 | Pu | ............. | H04N 19/30 375/240.12 |
| 2014/0376618 A1* | 12/2014 | Ma | ............. | H04N 19/177 375/240.03 |
| 2015/0139325 A1 | 5/2015 | Chuang et al. | | |
| 2015/0172713 A1* | 6/2015 | Komiya | ............. | H04N 19/423 375/240.15 |
| 2015/0237376 A1* | 8/2015 | Alshina | ............. | H04N 19/33 375/240.02 |
| 2015/0281708 A1* | 10/2015 | Chuang | ............. | H04N 19/577 375/240.02 |
| 2015/0281733 A1* | 10/2015 | Fu | ............. | H04N 19/30 375/240.16 |
| 2015/0288970 A1* | 10/2015 | Park | ............. | H04N 19/436 375/240.13 |
| 2015/0326865 A1* | 11/2015 | Yin | ............. | H04N 19/33 375/240.13 |

FOREIGN PATENT DOCUMENTS

| | | |
|---|---|---|
| CN | 101518086 A | 8/2009 |
| CN | 101796841 A | 8/2010 |
| CN | 102388611 A | 3/2012 |
| CN | 110035286 A | 7/2019 |
| EP | 1720358 A2 | 11/2006 |
| EP | 2870757 A1 | 5/2015 |
| JP | 2006-295913 A | 10/2006 |
| JP | 2009-538085 A | 10/2009 |
| KR | 10-2005-0089721 A | 9/2005 |
| KR | 10-2008-0093425 A | 10/2008 |
| RU | 2316909 C2 | 2/2008 |
| RU | 2341035 C1 | 12/2008 |
| RU | 2355126 C2 | 5/2009 |
| WO | 2007/081133 A1 | 7/2007 |
| WO | 2008/010932 A2 | 1/2008 |
| WO | 2009/000110 A1 | 12/2008 |
| WO | 2009/051692 A2 | 4/2009 |
| WO | 2010/093432 A1 | 8/2010 |

(56) References Cited

FOREIGN PATENT DOCUMENTS

| WO | 2012/036467 A3 | 5/2012 |
|---|---|---|
| WO | 2013/116415 A1 | 8/2013 |
| WO | 2014/011595 A1 | 1/2014 |

OTHER PUBLICATIONS

CN 101444104 A, US 2007/0223575 A1.
CN 101518086 A, WO 2008/010932 A2.
CN 101796841 A, WO 2009/000110 A1.
CN 102388611 A, WO 2010/093432 A1.
EP 2870757 A1, US 2014/0010294 A1.
JP 2006-295913 A, U.S. Pat. No. 7,876,833 B2.
JP 2009-538085 A, US 2009/0010331 A1.
KR 10-2005-0089721 A, US 2005/0195900 A1.
KR 10-2008-0093425 A, US 2009/0010331 A1.
RU 2316909 C2, US 2006/0197777 A1.
RU 2341035 C1, US 2006/0215762 A1.
RU 2355126 C2, US 2007/0171969 A1.
Bossen, Frank, "Common Test Conditions and Software Reference Configurations", JCTVC-H1100, JCT-VC, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-3.
Bross et al., "High Efficiency Video Coding (HEVC) Text Specification Draft 7", JCTVC-I1003, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 280 pages.
Chen et al., "AHG10: High-Level Syntax Hook for HEVC Multi-Standard Extensions", Qualcomm Incorporated, JCTVC-J0113, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-6.
Choi et al., "Scalable Structures and Inter-Layer Predictions for HEVC Scalable Extension", KWU (Kwangwoon University), JCTVC-F096, Joint Collaborative Team on Video Coding (JCT-VC) of ITU-T SG16 WP3 and ISO/IEC JTC1/SC29/WG11, 6th Meeting, Torino, IT, Jul. 14-22, 2011, pp. 1-15.
Dong et al., "Description of Scalable Video Coding Technology Proposal by InterDigital Communications", InterDigital Communications, LLC, JCTVC-K0034, Joint Collaborative Team on Video Coding (JCT-VC) of ITU-T SG16 WP3 and ISO/IEC JTC1/SC29/WG11, 11th Meeting: Shanghai, CN, Oct. 11-19, 2012, pp. 1-30.
Flierl et al., "Generalized B Pictures and the Draft H.264/AVC Video-Compression Standard", IEEE Transactions on Circuits and Systems for Video Technology, vol. 13, No. 7, Jul. 2003, pp. 587-597.
Husak et al., "AHG Report on MPEG Frame-Compatible Stereoscopic Coding", ISO/IEC JTC1/SC29/WG11 m21465, Geneva, CH, Nov. 2011, pp. 1-3.
ISO/IEC, "Information Technology-Coding of Audio-Visual Objects-Part 2: Visual", International Standard, ISO/IEC 14496-2, Dec. 1, 2001, 536 pages.
ISO/IEC, "Information Technology-Generic Coding of Moving Pictures and Associated Audio Information: Video", International Standard ISO/IEC 13818-2:2000 Technical Corrigendum 1, ICS 35.040, Ref. No. ISO/IEC 13818-2:2000/Cor.1:2002(E), Mar. 1, 2002, 4 pages.
ISO/IEC, "Information Technology-Coding of Moving Pictures and Associated Audio for Digital Storage Media at up to about 1,5 Mbit/s—Part 2: Video", International Standard ISO/IEC 11172-2:1993 Technical Corrigendum 3, ICS 35.040, Ref. No. ISO/IEC 11172-2:1993/Cor.3:2003(E), Nov. 1, 2003, pp. 1-6.
ITU-T, "Codec for Audiovisual Services AT n x 384 Kbit/s", H.261, Series H, Audiovisual and Multimedia Systems, Coding of Moving Video, The International Telegraph and Telephone Consultative Committee, Nov. 1988, 14 pages.
ITU-T, "Terms of Reference of the Joint Collaborative Team on 3D Video Coding Extensions Development", ITU-T Q6/16 Visual Coding and ISO/IEC JTC1/SC29/WG11 Coding of Moving Pictures and Audio, May 2012, 4 pages.
ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.
ITU-T, "Video Coding for Low Bit Rate Communication", H.263, Transmission of Non-Telephone Signals, Mar. 1996, 52 pages.
ISO/IEC, "Call for Proposals on 3D Video Coding Technology", Video and Requirement, ISO/IEC JTC1/SC29/WG11 MPEG2011/N12036, Geneva, Switzerland, Mar. 2011, 20 pages.
Jeon, Byeong-Moon, "Clean Up for Temporal Direct Mode", LG Electronics, Inc., JVT-E097, Joint Video Team (JVT) of ISO/IEC MPEG & ITU-T VCEG (ISO/IEC JTC1 /SC29/WG11 and ITU-T SG16 Q.6), 5th Meeting: Geneva, CH, Oct. 9-17, 2002, pp. 1-12.
Luthra et al., "Draft Call for Proposals on the Scalable Video Coding Extensions of HEVC", WG11 AHG on Study of HEVC Extensions, ISO/IEC JTC1/SC29/WG11 M24482, Geneva, Switzerland, Apr. 2012, 11 pages.
Luthra, Ajay, "Scalable Enhancement Requirements for HEVC", Motorola Mobility, JCTVC-E502, Joint Collaborative Team on Video Coding (JCT-VC) of ITU-T SG16 WP3 and ISO/IEC JTC1/SC29/WG11, 5th Meeting, Geneva, CH, Mar. 16-23, 2011, pp. 1-10.
Luthra, Ajay, "Use Cases for the Scalable Enhancement of HEVC", WG11 AHG on Study of HEVC Extensions, ISO/IEC JTC1/SC29/WG11 M24483, Geneva, Switzerland, Apr. 2012, 8 pages.
Luthra et al., "Requirements for the Scalable Enhancement of HEVC", WG11 AHG on Study of HEVC Extensions, ISO/IEC JTC1/SC29/WG11 M24484, Geneva, Switzerland, Apr. 2012, 12 pages.
Müller et al., "AHG Report on 3D Video Coding", ISO/IEC JTC1/SC29/WG11 MPEG12/m24033, Geneva, CH, Apr. 2012, pp. 1-24.
Ohm, Jens-Rainer, "Advances in Scalable Video Coding", Proceedings of the IEEE, vol. 93, No. 1, Jan. 2005, pp. 42-56.
Ohm et al., "Work Plan in 3D Standards Development", JCT3V-B1006, JCT-3V, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, pp. 1-5.
Schwarz et al., "Overview of the Scalable H.264/MPEG4-AVC Extension", IEEE International Conference on Image Processing, Oct. 8-11, 2006, pp. 161-164.
Schwarz et al., "Overview of the Scalable Video Coding Extension of the H.264/AVC Standard", IEEE Transactions on Circuits and Systems for Video Technology, vol. 17, No. 9, Sep. 2007, pp. 1-18.
Schwarz et al., "SI-SVC: Overview of the Scalable Extension of the H.264 / MPEG-4 AVC Video Coding Standard", JVT-U145-L, Fraunhofer HHI, Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, pp. 1-21.
Sullivan et al. "Rate-Distortion Optimization for Video Compression", Signal Processing Magazine, IEEE, vol. 15, No. 6, Nov. 1998, pp. 74-90.
Tseng et al., "Multiviewpoint Video Coding with MPEG-2 Compatibility", IEEE Transactions on Circuits and Systems for Video Technology, vol. 6, No. 4, Aug. 1996, pp. 414-419.
Vetro et al. "Overview of the Stereo and Multiview Video Coding Extensions of the H.264/MPEG-4 AVC Standard", Proceedings of the IEEE, vol. 99, No. 4, Apr. 2011, pp. 1-15.
Wiegand et al., Text of ISO/IEC 14496-10:200X / FDIS Advanced Video Coding (4th Edition), JVT, ISO/IEC JTC1/SC29/WG11, MPEG07/N9198, Lausanne, CH, Jul. 2007, 563 pages.
Winken et al., "Bit-Depth Scalable Video Coding", IEEE, International Conference on Image Processing, IEEE International Conference on Image Processing, San Antonio, TX, Sep. 16, 2007, 4 pages.
Ye, Yan, "On Adaptation Parameter Signalling", InterDigital Communications, JCTVC-H0132, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-8.
Yin et al., "M26661: MFC Coding Technology Proposal by Dolby Laboratories", CFP Presentation, Oct. 2012, 38 pages.

(56) References Cited

OTHER PUBLICATIONS

"Layer Dependency and Priority Signaling Design for Scalable Video Coding", InterDigital Invention Disclosure, Jun. 2012.

"Method and Apparatus of Reference Picture Set Signaling and Prediction for Scalable HEVC Coding", InterDigital Invention Disclosure 11349, Apr. 2012.

"Method and Apparatus of Signaling Reference Picture for HEVC Scalable Coding", InterDigital Invention Disclosure 11252, Jan. 2012.

ITU-T, "Advanced Video Coding for Generic Audiovisual Services", Recommendation ITU-T H.264, Series H: Audiovisual and Multimedia Systems, Infrastructure of Audiovisual Services—Coding of Moving Video, Mar. 2009, 670 pages.

* cited by examiner

CODEC ARCHITECTURE FOR MULTIPLE LAYER VIDEO CODING

CROSS REFERENCE TO RELATED APPLICATIONS

This application is a continuation application of U.S. patent application Ser. No. 15/863,088, filed Jan. 5, 2018, which is a continuation application of U.S. patent application Ser. No. 13/937,645, filed Jul. 9, 2013, now issued as U.S. Pat. No. 9,998,764, which claims the benefit of U.S. Provisional Patent Application Nos. 61/669,356 filed on Jul. 9, 2012, and 61/734,264 filed on Dec. 6, 2012, the contents of which are hereby incorporated by reference herein.

BACKGROUND

Multimedia technology and mobile communications have experienced massive growth and commercial success in recent years. Wireless communications technology has dramatically increased the wireless bandwidth and improved the quality of service for mobile users. For example, 3rd Generation Partnership Project (3GPP) Long Term Evolution (LTE) standard has improved the quality of service as compared to 2nd Generation (2G) and/or 3rd Generation (3G).

With the availability of high bandwidths on wireless networks, video and multimedia content that is available on the wired web may drive users to desire equivalent on-demand access to that content from a wide variety of mobile devices with different size, quality, and/or connectivity capabilities.

To make the various types of video content available over networks, one or more video coding and compression mechanisms may be used. The video coding systems may be used to compress digital video signals, e.g., to reduce the storage need and/or transmission bandwidth of such signals. Various types of video compression technologies based on one or more video coding standards may be used. The standards may include, for example, H.261, MPEG-1, MPEG-2, H.263, MPEG-4 part 2, and H.264/MPEG-4 part 10 AVC, High Efficiency Video Coding (HEVC), etc. Extension of the video coding standards, e.g., H.264 (scalable video coding (SVC)), and/or scalable HEVC may be used. The scalable coding mechanisms provided may have disadvantages and may be inadequate.

SUMMARY

Systems, methods, and instrumentalities are provided to implement a video coding system (VCS). The VCS including, e.g. a base layer (BL) coder, an enhancement layer (EL) coder, an inter-layer prediction (ILP) processing and management unit etc. may be configured to receive a video signal. The video signal may comprise one or more layers (e.g., a base layer (BL) and/or one or more enhancement layers (ELs)). The VCS may process a BL picture into an inter-layer reference (ILR) picture, e.g., using picture level inter-layer prediction process. The processed ILR picture may be a non-collocated ILR picture.

The processing of the BL picture into an ILR picture may include formatting the BL picture into a format that may be suitable for prediction of a current EL picture. The format may be dependent on a type of scalability between a BL codec and an EL codec. The type of scalability between the BL codec and the EL codec may include one or more of spatial scalability, chroma format scalability, quality scalability, spatial scalability, view scalability, or bit-depth scalability. The formatting may include one or more of upsampling, denoising, restoration, or retargeting, disparity compensation, or inverse tone mapping.

The VCS may select one or both of the processed ILR picture or an enhancement layer (EL) reference picture. The selected reference picture(s) may comprise one of the EL reference picture, or the ILR picture. A plurality of the selected reference pictures may correspond to a common time instance.

The VCS may predict a current EL picture using one or more of the selected ILR picture or the EL reference picture. The VCS may store the processed ILR picture in an EL decoded picture buffer (DPB). The VCS may extract BL information from the BL. The BL information may include one or more of BL mode information or BL motion information. The VCS may process the BL picture based on information comprising the extracted BL information. The VCS may convert BL information from a first format to a second format and may use the converted BL information in EL coding. The first format may relate to a BL codec and the second format may relate to an EL codec, and the first format may be different from the second format.

The VCS may packetize the ILP information and send the ILP information, e.g., via network abstraction layer (NAL) units. The ILP information may include, e.g., upsampling filter information, one or more coefficients for upsampling, one or more coefficients for denoising, one or more of disparity compensation parameters, one or more of inverse tone mapping parameters, etc.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate flow charts, which are meant to be exemplary. Other embodiments may be used. The order of the messages may be varied where appropriate. Messages may be omitted if not needed, and, additional flows may be added.

Scalable video coding may improve the quality of experience for video applications running on devices with different capabilities over heterogeneous networks. Scalable video coding may encode the signal once at a highest representation (e.g., temporal resolution, spatial resolution, quality, etc.), but enable decoding from subsets of the video streams depending on the specific rate and representation required by certain applications running on a client device. Scalable video coding may save bandwidth and/or storage compared to non-scalable solutions. The international video standards, e.g., MPEG-2 Video, H.263, MPEG4 Visual, H.264, etc. may have tools and/or profiles that support modes of scalability.

Figure 1:
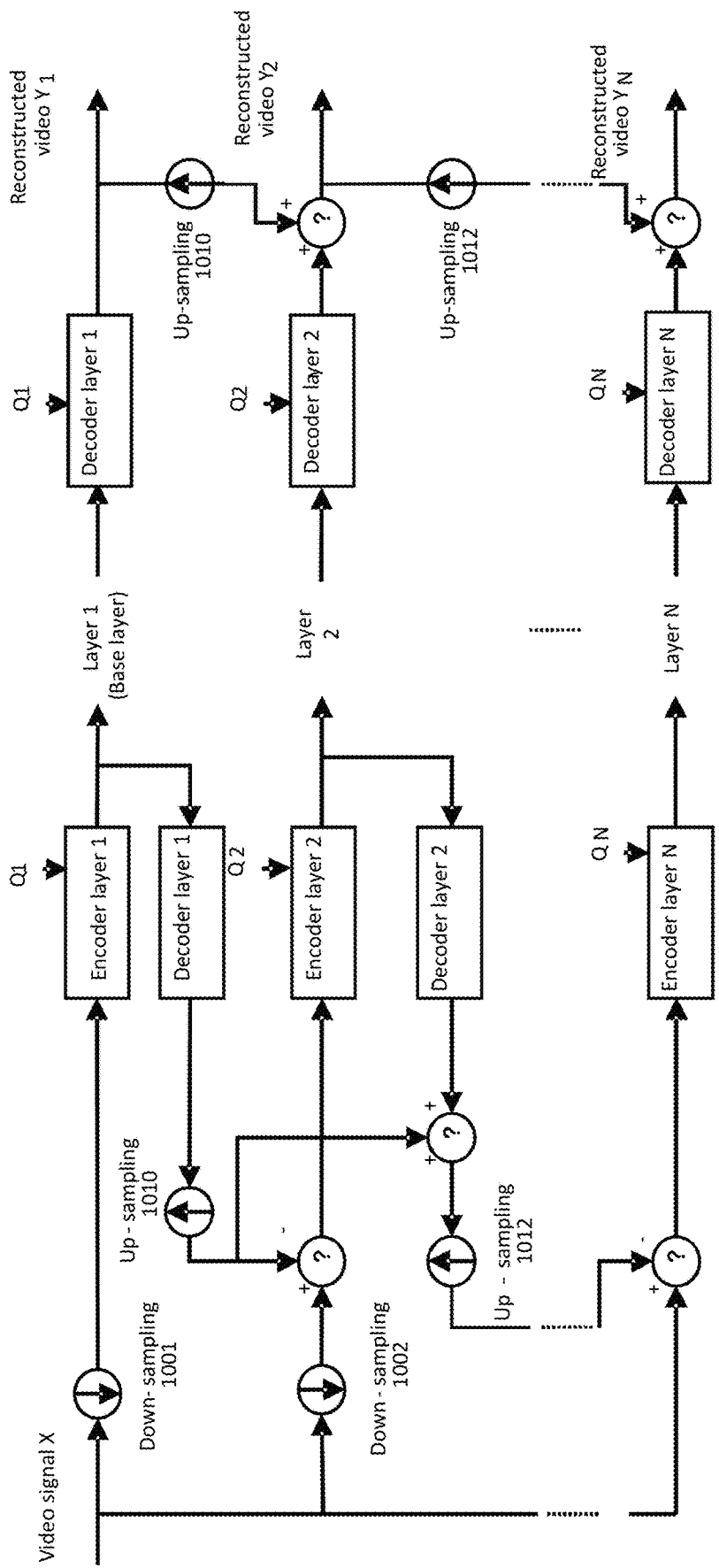
FIG. 1 is a diagram illustrating an example of a scalable video encoding system.

FIG. 1 is a diagram illustrating an example of a block-based hybrid scalable video encoding system. The spatial/temporal signal resolution that may be represented by the layer 1 (e.g., the base layer) may be generated by down-sampling of the input video signal. An appropriate setting of the quantizer (e.g., Q1) may lead to a certain quality level of the base information. The base-layer reconstruction Y1, which may be an approximation of one or more (e.g., all) of the higher layer resolution levels, may be utilized in the encoding/decoding of the subsequent layers, for example, to more efficiently encode the subsequent higher layers. The up-sampling unit 1010 and/or 1012 may perform up-sampling of the base layer reconstruction signal to layer-2's resolution. Down-sampling and up-sampling may be performed throughout each of the layers (e.g., 1, 2. . . N). The down-sampling and up-sampling ratios may be different depending on the dimension of the scalability between two given layers.

As illustrated in FIG. 1, for any given higher layer n ($2 \leq n \leq N$), a differential signal may be generated by subtracting an upsampled lower layer signal (e.g., layer n−1 signal) from the current layer n signal. The difference signal obtained may be encoded. If the video signals represented by two layers (e.g., n1 and n2) have the same spatial resolution, the corresponding down-sampling and up-sampling operations may be by-passed. Any given layer n ($1 \leq n \leq N$) or a plurality of layers may be decoded without using any decoded information from higher layers. Relying on coding of the residual signal (e.g., the difference signal between two layers) for the layers except the base layer, for example, as may be utilized by the system of FIG. 1, may cause visual artifacts. The visual artifacts may be due to a desire to quantize and normalize the residual signal to restrict its dynamic range, and/or additional quantization performed during coding of the residual. One or more of the higher layer encoders may adopt motion estimation and/or motion compensated prediction as an encoding mode. Motion estimation and/or motion compensation in a residual signal may be different from conventional motion estimation and, for example, may be more prone to visual artifacts. More sophisticated residual quantization, as well as joint quantization between the desire to quantize and normalize the residual signal to restrict its dynamic range and additional quantization performed during coding of the residual may be utilized and may increase system complexity, for example, to minimize such visual artifacts. The system of FIG. 1 may not consider other inter-layer prediction modes, which may limit the level of compression efficiency it may achieve.

Scalable Video Coding (SVC) is an extension of H.264 that may enable the transmission and decoding of partial bit streams, for example, to provide video services with lower temporal or spatial resolutions or reduced fidelity while retaining a reconstruction quality (e.g., higher reconstruction quality) given the rate of the partial bit streams. SVC may include Single Loop Decoding, which may provide that an SVC decoder set up one motion compensation loop at the layer being decoded, and may not set up motion compensation loop(s) at other lower layer(s). For example, if the bitstream includes 2 layers, layer 1 (e.g., a base layer) and layer 2 (e.g., an enhancement layer). A decoder may reconstruct layer 2 video by setting a decoded picture buffer and motion compensated prediction (e.g., for layer 2 and not for layer 1; layer 2 may depend on layer 1). SVC may not require a reference picture(s) from lower layers to be fully reconstructed, which may reduce computational complexity and memory utilized at the decoder. Single loop decoding may be achieved by constrained inter-layer texture prediction. For a block (e.g., a current block) in a given layer, spatial texture prediction from a lower layer may be utilized if the corresponding low layer block is coded in intra mode (e.g., restricted intra prediction). When the lower layer block is coded in intra mode, it may be reconstructed without motion compensation operations and a decoded picture buffer. SVC may utilize additional inter-layer prediction techniques, for example, motion vector prediction, residual prediction, mode prediction etc. The single loop decoding feature of SVC may reduce the computational complexity and/or memory utilized at the decoder. The single loop decoding may increase implementation complexity, for example, by relying heavily on block-level inter layer prediction implementations to achieve satisfactory performance. Encoder design and computation complexity may be increased such that the desired performance may be achieved, for example, to compensate for the performance penalty incurred by imposing the single loop decoding constraint. Scalable coding of interlaced content may not be supported by SVC with sufficient performance, which may affect its adoption by the broadcasting industry.

Figure 2:
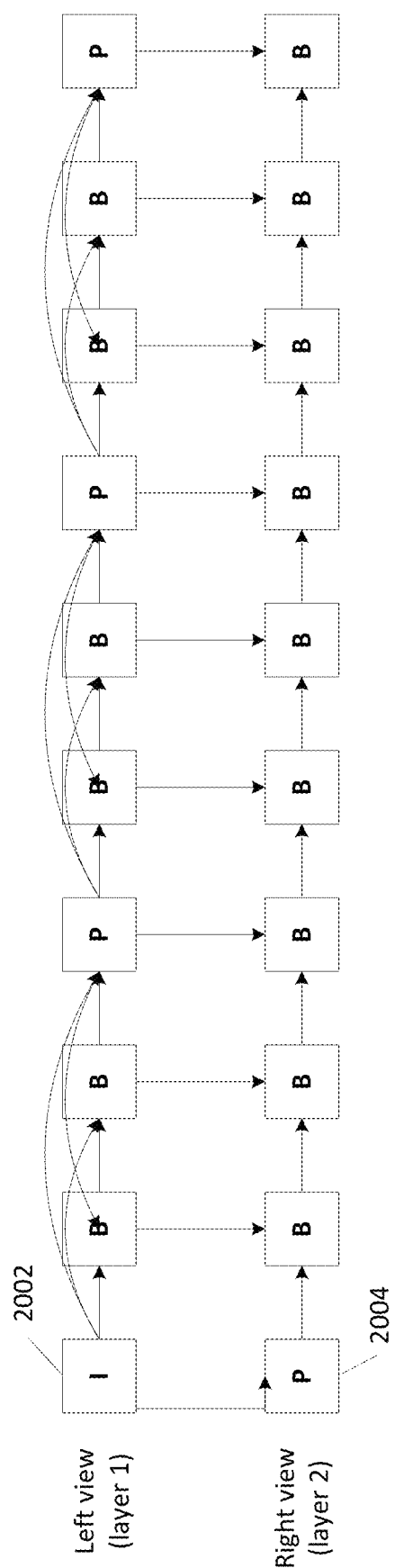
FIG. 2 is a diagram illustrating an example of a prediction structure using multi-view video coding (MVC) to code a stereoscopic video, e.g., with a left view and a right view.

Multi-view Video Coding (MVC) is an example extension of H.264 that may provide view scalability. View scalability may mean that the base layer bitstream may be decoded to reconstruct a conventional 2D video, and additional enhancement layers may be decoded to reconstruct other view representations of the same video signal. When one or more views (e.g., all views) are combined together and displayed by a proper 3D display, the user may experience 3D video with proper depth perception. FIG. 2 is a diagram illustrating an example prediction structure using MVC to code a stereoscopic video with a left view (e.g., a layer 1) and a right view (e.g., a layer 2). As illustrated by example in FIG. 2, the left view video may be coded with IBBP prediction structure. The right view video may be coded with PBBB prediction structure. For example, in the right view, the first collocated picture with the first I picture 2002 in the left view may be coded as a P picture 2004. Each of the other pictures in the right view may be coded as B pictures, for example, with the first prediction coming from temporal references in the right view and the second prediction coming from inter-layer reference in the left view. MVC may not support the single loop decoding. For example as shown in FIG. 2, decoding of the right view (e.g., a layer 2) video may require the entire pictures in the left view (e.g., a layer 1) to be available, which may support motion compensation loops in both views/layers.

MVC may include (e.g., only include) high level syntax changes, and may not include block-level changes to H.264/AVC. For example, since the underlying MVC encoder/decoder logics may remain the same and may be duplicated, reference pictures (e.g., only reference pictures) at slice/picture level may be correctly configured to enable MVC. MVC may support coding of more than two views by extending the example of FIG. 2 to perform inter-layer prediction across multiple views.

Moving Picture Experts Group (MPEG) frame compatible (MFC) coding may be utilized as a coding technique. 3D content may be stereoscopic 3D video that may include one or more views, e.g., a left view and a right view. Stereoscopic 3D content delivery may be achieved by packing/multiplexing the two views into one frame, compressing and transmitting the packed video with a codec (e.g., H.264/AVC). At the receiver side, after decoding, the frames may be unpacked and displayed as two views. The views may be multiplexed in the temporal domain and/or the spatial domain. When the views are multiplexed in the spatial domain, the two views may be spatially downsampled by a factor (e.g., a factor of two) and packed by various arrangements, for example in order to maintain the same picture size. For example, a picture may be arranged with the downsampled left view on the left half of the picture, and the downsampled right view on the right half of the picture. Other arrangements may include top-and-bottom, line-by-line, checkerboard, etc. The specific arrangement used to achieve frame compatible 3D video may be conveyed by frame packing arrangement SEI messages. Spatial downsampling may cause aliasing in the views and reduce the visual quality and user experience of 3D video. A focus may be placed on providing a scalable extension to frame compatible (e.g., two views packed into the same frame) base layer video, and/or providing one or more enhancement layers to recover the full resolution views for improved 3D experience. Though it may be geared toward offering 3D video delivery, the underlying technology that may enable full-resolution MFC may be related to spatial scalability technologies.

A scalable enhancement of HEVC may be provided. Standards scalability may refer to the type of scalability when the base layer is encoded with one standard, for example H.264/AVC or MPEG2, while the one or more enhancement layers may be encoded using another standard, for example the HEVC standard. Standards scalability may provide backward compatibility for legacy content encoded using previous standards, and may enhance the quality of the legacy content with one or more enhancement layers.

3D video coding (3DV) may be provided. 3DV may provide one or more different view scalabilities that may be targeted for autostereoscopic applications. Autostereoscopic displays and applications may allow people to experience 3D without the cumbersome glasses. In order to achieve good 3D experience without glasses, more than two views may be utilized. Coding more than two views (e.g., 9 views or 10 views) may be expensive. 3DV may utilize a hybrid approach of coding a few views (e.g., 2 or 3 views) with relatively large disparity together, and/or with one or more depth maps that may provide depth information of the views. This may be referred to as Multi-View plus Depth (MVD). At the display side, the coded views and depth maps may be decoded. The remaining views may be generated using the decoded views and their depth maps using view synthesis technologies. 3DV may utilize various implementations to code the views and the depth maps, for example coding them using a combination of different standards, such as but not limited to H.264/AVC, MVC, HEVC, etc. 3DV may code the base layer with one standard (e.g., H.264/AVC) and code one or more of the enhancement layers with another standard (e.g., HEVC).

Table 1 provides an example of different types of scalabilities along with the corresponding standards that may support them. Bit-depth scalability and chroma format scalability may be tied to video formats (e.g., higher than 8-bit video, and chroma sampling formats higher than YUV4:2:0) primarily used by professional video applications. Aspect ratio scalability may be provided.

TABLE 1

| Scalability | Example | Standards |
| --- | --- | --- |
| View scalability | 2D→3D (2 or more views) | MVC, MFC, 3DV |
| Spatial scalability | 720 p→1080 p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC |
| Chroma format scalability | YUV4:2:0→YUV4:2:2, YUV4:4:4 | Scalable HEVC |
| Aspect ratio scalability | 4:3→16:9 | Scalable HEVC |

Scalable video coding may provide a first level of video quality associated with a first set of video parameters using the base layer bitstream. Scalable video coding may provide one or more levels of higher quality associated with one or more sets of enhanced parameters using one or more enhancement layer bitstreams. The set of video parameters may include one or more of spatial resolution, frame rate, reconstructed video quality (e.g., in the form of SNR, PSNR, VQM, visual quality, etc.), 3D capability (e.g., with two or more views), luma and chroma bit depth, chroma format, and underlying single-layer coding standard. As illustrated in Table 1, different use cases may require different types of scalability. As discussed herein, a scalable coding architecture may offer a common structure that may be configured to support one or more scalabilities (e.g., the scalabilities listed in Table 1). A scalable coding architecture may be flexible to support different scalabilities with minimum configuration efforts. A scalable coding architecture may include at least one preferred operating mode that may not require changes to block level operations, such that the coding logics (e.g., encoding and/or decoding logics) may be maximally reused within the scalable coding system. For example, a scalable coding architecture based on picture level inter-layer processing and management unit may be provided, wherein the inter-layer prediction may be performed at the picture level.

Figure 3:
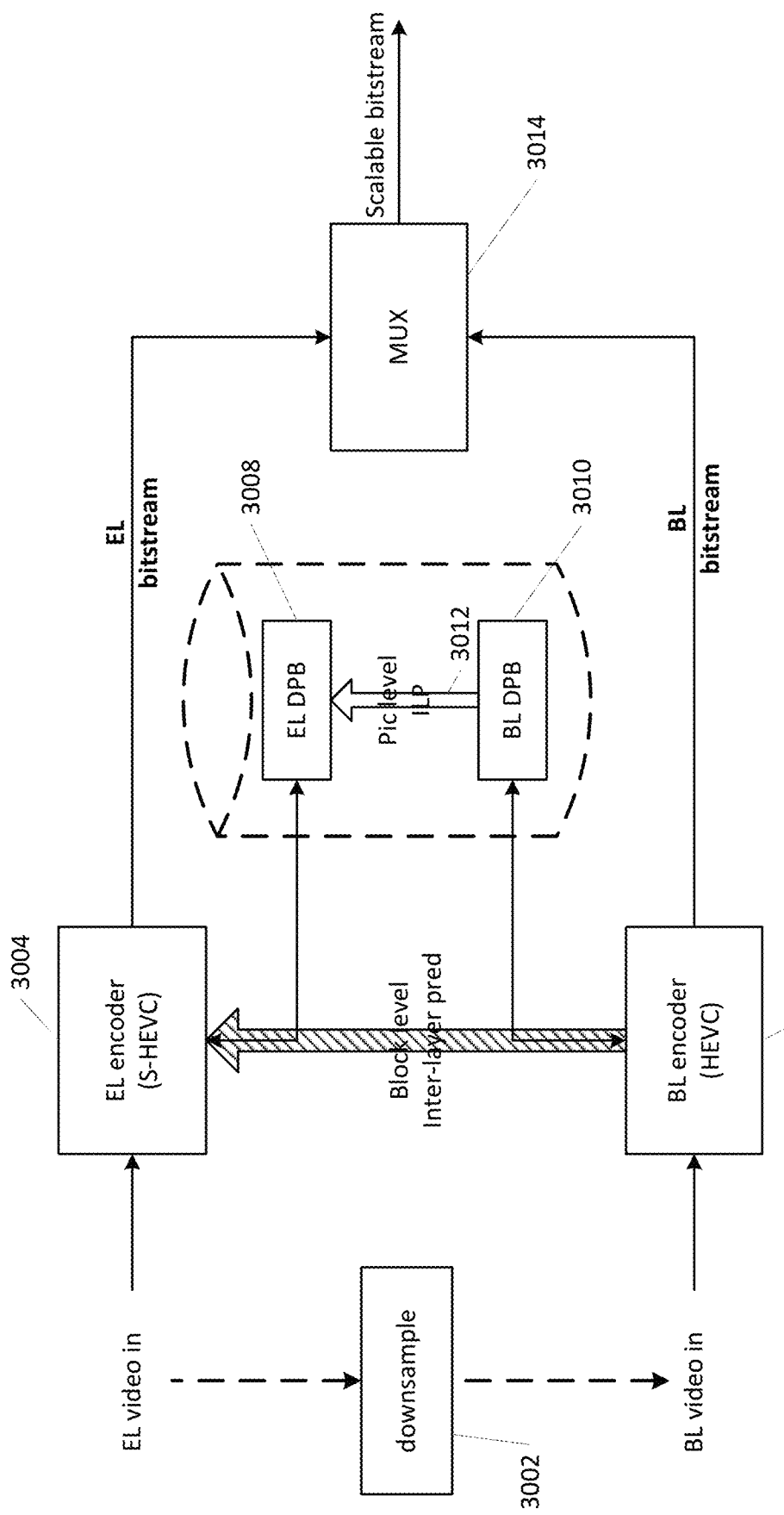
FIG. 3 is a diagram illustrating an example of an architecture of a 2-layer scalable video encoder.
Figure 5:
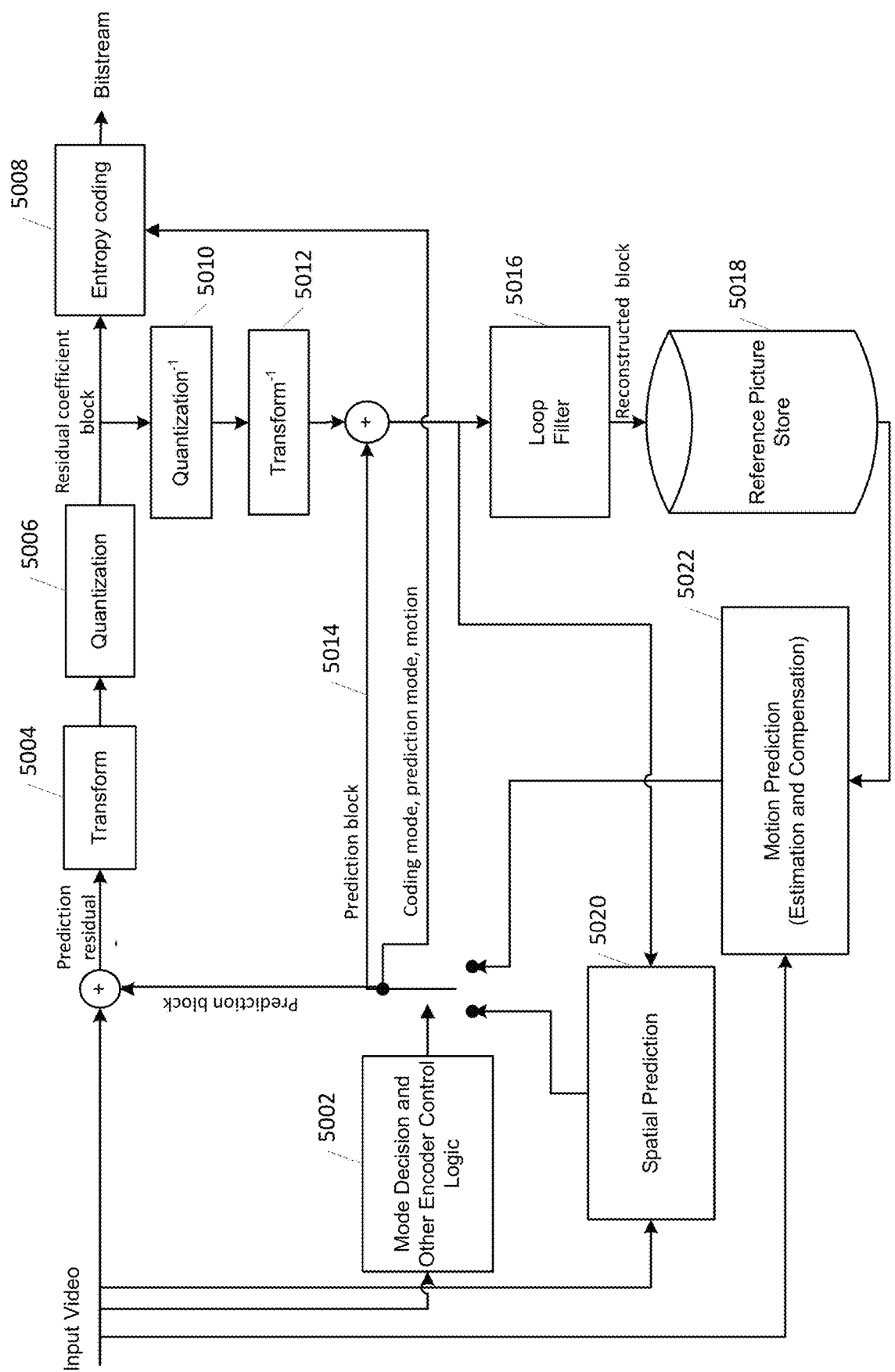
FIG. 5 is a diagram illustrating an example of a block-based single layer video encoder.

FIG. 3 is a diagram of example architecture of a two-layer scalable video encoder. For example, the enhancement layer video input and the base layer video input may correspond to each other by the down-sampling process that may achieve spatial scalability. As illustrated in FIG. 3, an enhancement layer video may be down-sampled using a down sampler 3002. The base layer encoder 3006 (e.g., an HEVC encoder in this example) may encode the base layer video input block by block and generate a base layer bitstream. FIG. 5 is a diagram that illustrates an example block-based single layer video encoder that may be used as the base layer encoder in FIG. 3. As illustrated in FIG. 5 a single layer encoder may employ techniques such as spatial prediction 5020 (e.g., referred to as intra prediction) and/or temporal prediction 5022 (e.g., referred to as inter prediction and/or motion compensated prediction) to achieve efficient compression, and/or predict the input video signal. The encoder may have mode decision logics 5002 that may choose the most suitable form of prediction. The encoder decision logics may be based on a combination of rate and distortion considerations. The encoder may transform and quantize the prediction residual (e.g., the difference signal between the input signal and the prediction signal) using the transform unit 5004 and quantization unit 5006 respectively. The quantized residual, together with the mode information (e.g., intra or inter prediction) and prediction information (e.g., motion vectors, reference picture indexes, intra prediction modes, etc.) may be further compressed at the entropy coder 5008 and packed into the output video bitstream. The encoder may also generate the reconstructed video signal by applying inverse quantization (e.g., using inverse quantization unit 5010) and inverse transform (e.g., using inverse transform unit 5012) to the quantized residual to obtain reconstructed residual. The encoder may add the reconstructed video signal back to the prediction signal 5014. The reconstructed video signal may go through loop filter process 5016 (e.g., using deblocking filter, Sample Adaptive Offsets, and/or Adaptive Loop Filters), and may be stored in the reference picture store 5018 to be used to predict future video signals.

Figure 6:
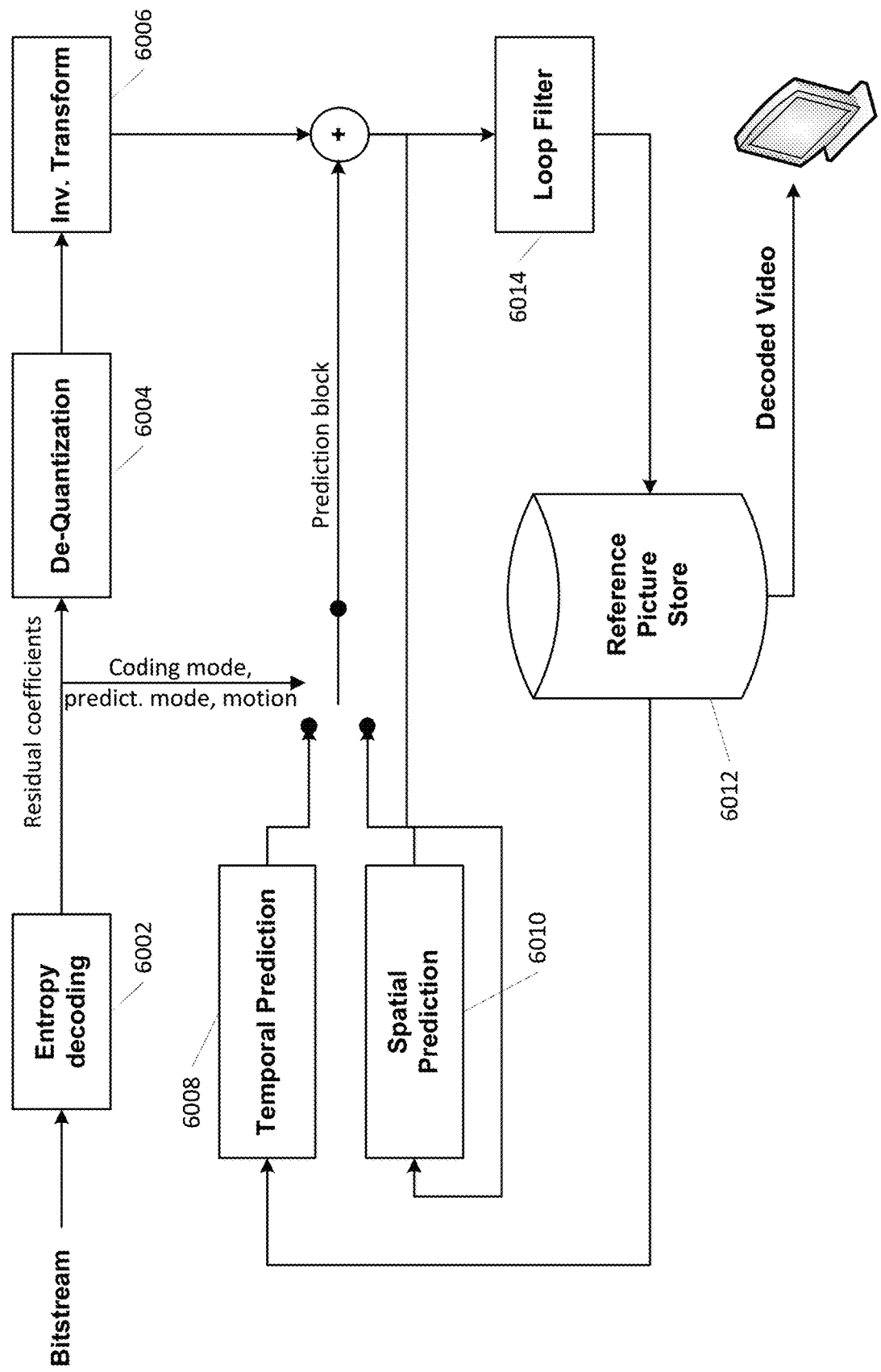
FIG. 6 is a diagram illustrating an example of a block-based single layer video decoder.

The term reference picture store may be used interchangeably herein with the term decoded picture buffer or DPB. FIG. 6 is a block diagram of an example block-based single layer decoder that may receive a video bitstream produced by the encoder of FIG. 5 and may reconstruct the video signal to be displayed. At the video decoder, the bitstream may be parsed by the entropy decoder 6002. The residual coefficients may be inverse quantized (e.g., using the de-quantization unit 6004) and inverse transformed (e.g., using the inverse transform unit 6006) to obtain the reconstructed residual. The coding mode and prediction information may be used to obtain the prediction signal. This may be accomplished using spatial prediction 6010 and/or temporal prediction 6008. The prediction signal and the reconstructed residual may be added together to get the reconstructed video. The reconstructed video may additionally go through loop filtering (e.g., using loop filter 6014). The reconstructed video may then be stored in the reference picture store 6012 to be displayed and/or be used to decode future video signals.

As illustrated in the example scalable encoder of FIG. 3, at the enhancement layer, the enhancement layer (EL) encoder 3004 may take EL input video signal of higher spatial resolution (and/or higher values of other video parameters). The EL encoder 3004 may produce an EL bitstream in a substantially similar manner as the base layer video encoder 3006, e.g., utilizing spatial and/or temporal predictions to achieve compression. An additional form of prediction, referred to herein as inter-layer prediction (ILP) (e.g., as indicated by the shaded arrows in FIG. 3), may be available at the enhancement encoder to improve its coding performance. Unlike spatial and temporal predictions that derive the prediction signal based on coded video signals in the current enhancement layer, inter-layer prediction may derive the prediction signal based on coded video signals from the base layer (and/or other lower layers when there are more than two layers in the scalable system). At least two forms of inter-layer prediction, picture-level ILP and block-level ILP, may exist in the scalable system. Picture-level ILP and block-level ILP are discussed herein. A bitstream multiplexer (e.g., the MUX 3014 in FIG. 3) may combine the base layer and enhancement layer bitstreams together to produce one scalable bitstream.

Figure 4:
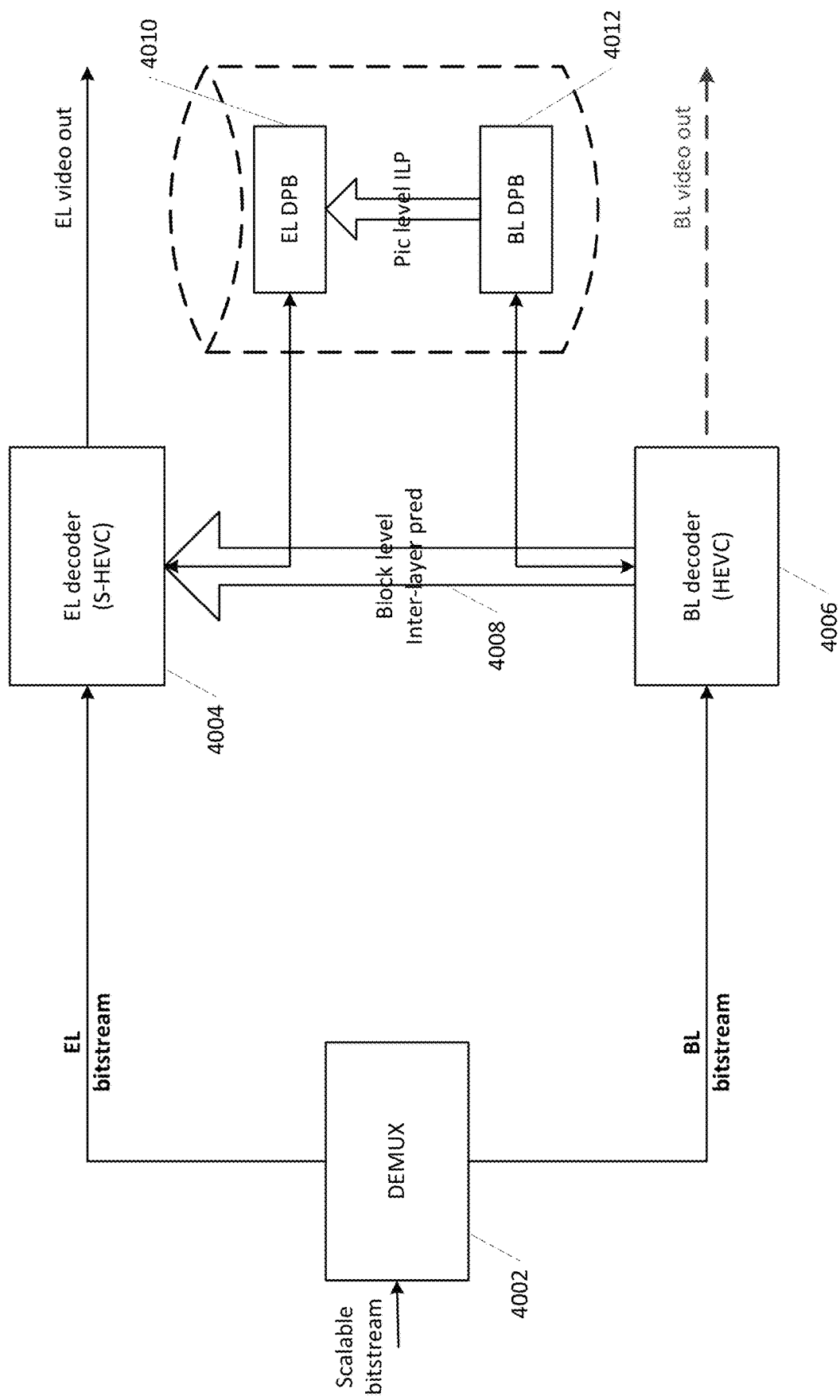
FIG. 4 is a diagram illustrating an example of an architecture of a 2-layer scalable video decoder.

FIG. 4 is a block diagram of example architecture of a 2-layer scalable video decoder. The 2-layer scalable video decoder architecture of FIG. 4 may correspond to the scalable encoder in FIG. 3. For example, the de-multiplexer (e.g., the DEMUX 4002) may separate the scalable bitstream into the base layer and the enhancement layer bitstreams. The base layer decoder 4006 may decode the base layer bitstream and may reconstruct the base layer video. The enhancement layer decoder 4004 may decode the enhancement layer bitstream. The enhancement layer decoder may do so using information from the current layer and/or information from one or more dependent layers (e.g., the base layer). For example, such information from one or more dependent layers may go through inter layer processing, which may be accomplished when picture-level ILP and/or block-level ILP are used. Though not shown in FIGS. 3 and 4, additional ILP information may be multiplexed together with base and enhancement layer bitstreams at the MUX 3014. The ILP information may be de-multiplexed by the DEMUX 4002.

Figure 7:
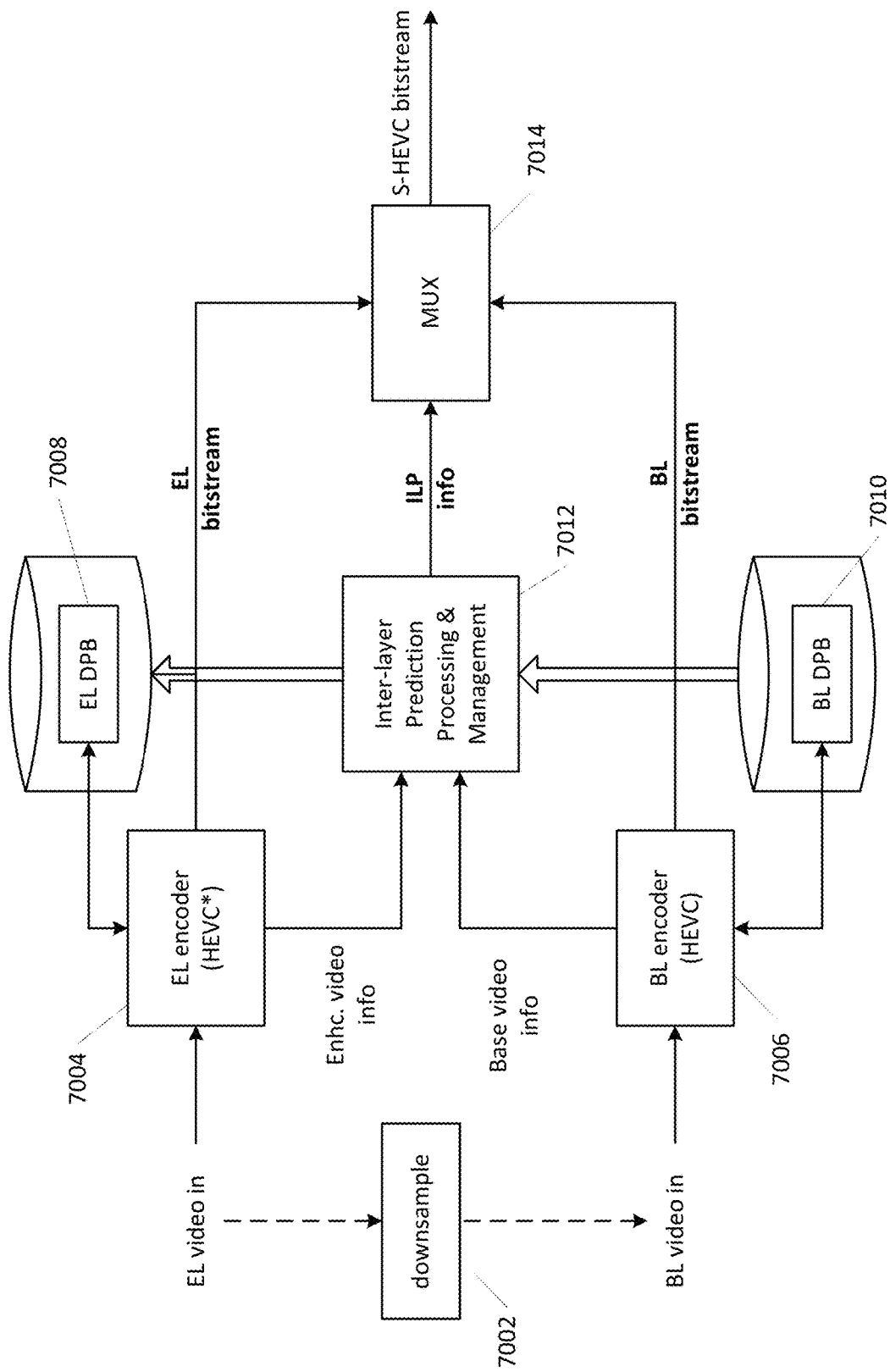
FIG. 7 is a diagram illustrating an example of a two-layer scalable encoding system with picture-level inter-layer prediction (ILP) support.

FIG. 7 is an example two-layer scalable coding system with picture-level ILP support. The BL encoder 7006 (e.g., an HEVC encoder) in FIG. 7 may encode the BL video input using a combination of spatial and/or temporal prediction, such as, but not limited as discussed with reference to FIG. 5. The BL encoder may establish a base layer DPB 7010 to store the reconstructed pictures to perform prediction of input video signal, e.g., through temporal motion compensated prediction. In the enhancement layer, the EL encoder 7004 may operate in a manner substantially similar to the BL encoder 7006. The enhancement layer DPB 7008 that may provide reference pictures for prediction of the input EL video by the EL encoder may include reference pictures from the current enhancement layer and/or reference pictures from the DPB of one or more dependent layers (for example, a BL DPB 7010, as illustrated in FIG. 7). The reference pictures from the BL DPB may be processed by the inter-layer prediction processing and management unit 7012 before being used to predict the EL video. The inter-layer prediction processing and management unit 7012 may process pictures from the BL DPB 7010 before using them to predict the EL video. The ILP processing and management unit 7012 may process one or more reference pictures stored in the BL DPB 7010 into a format that is suitable for prediction of the enhancement layer video. The ILP processing and management unit 7012 may manage the processed reference pictures and adaptively decide which ones of the processed pictures may be used as prediction for the EL video by the EL encoder 7004.

The ILP processing and management unit may process the reference pictures stored in the BL DPB into a format that may be suitable for prediction of the enhancement layer video. The nature of the processing may be based on the type of scalability between the BL and the EL. For example, if the BL video and the EL video are of different spatial resolutions, the processing may involve upsampling in order to align the BL and EL spatial resolutions. The processing may convey the parameters used in the upsampling process. For example, the ILP processing and management unit 7012 may establish a pre-defined set of upsampling filters. The ILP processing and management unit 7012 may choose one or more of the predefined upsampling filters to upsample the pictures in the BL DPB and may send the one or more corresponding filter indices in the bitstream. For example, the decoder may perform the same upsampling process. The ILP processing and management unit may derive (e.g., adaptively derive) the one or more upsampling filters that are advantageous to use (for example, in the sense that the upsampled references may be used to predict the EL video more effectively and produce more favorable rate distortion characteristics). When adaptive upsampling filters are used, the filter coefficients and filter tap sizes may be included in the bitstream.

In another example of SNR or quality scalability, the BL video and the EL video may have the same resolution. The BL video may be coded with coarser quantization (for example, lower bit rate with lower quality), whereas the EL video may be coded with finer quantization (for example, higher bit rate with higher quality). The ILP processing and management unit 7012 may perform de-noising and/or image restoration type of operations on the reference pictures in the BL DPB 7010. Such de-noising or restoration operations may include, but are not limited to adaptive filters (e.g., based on Least Squared or LS techniques), sample adaptive offsets (SAO) (e.g., as may be supported by HEVC), and/or other types of de-noising filters targeted at, for example, reducing quantization noise. The corresponding parameters that may be used in the de-noising or restoration operations may be signaled to the decoder. Such de-noising or restoration techniques may be combined with up-sampling process to improve the prediction effectiveness for the spatial scalability case. As illustrated in FIG. 7, the coded EL bitstream, the coded BL bitstream, and the ILP information may be multiplexed (e.g., the MUX 7014) into scalable HEVC bitstream.

As an example of view scalability, the BL video and the EL video may represent two views of a stereoscopic 3D video. The BL video may represent one view and the EL video may represent the other complementary view. The ILP processing and management unit may apply disparity compensation to the reference pictures in the BL DPB, such that they become effective prediction signal for the EL video. For a decoder to perform the same disparity compensation processing, parameters used during disparity compensation (for example, the affine transformation parameters if affine transformation is used, and/or the warping parameters if warping is used) may be signaled in the bitstream.

Table 2 illustrates a list of example of functions that the ILP processing and management unit may perform and the corresponding scalability types for which the specific function may be used.

TABLE 2

| ILP processing examples | Applicable scalability types |
| --- | --- |
| Upsampling | Spatial scalability, chroma format scalability |
| Denoising, restoration, retargeting | SNR or quality scalability, spatial scalability, view scalability, standard scalability, aspect ratio scalability etc. |
| Disparity compensation | View scalability |
| Inverse tone mapping | Bit-depth scalability |

Figure 9:
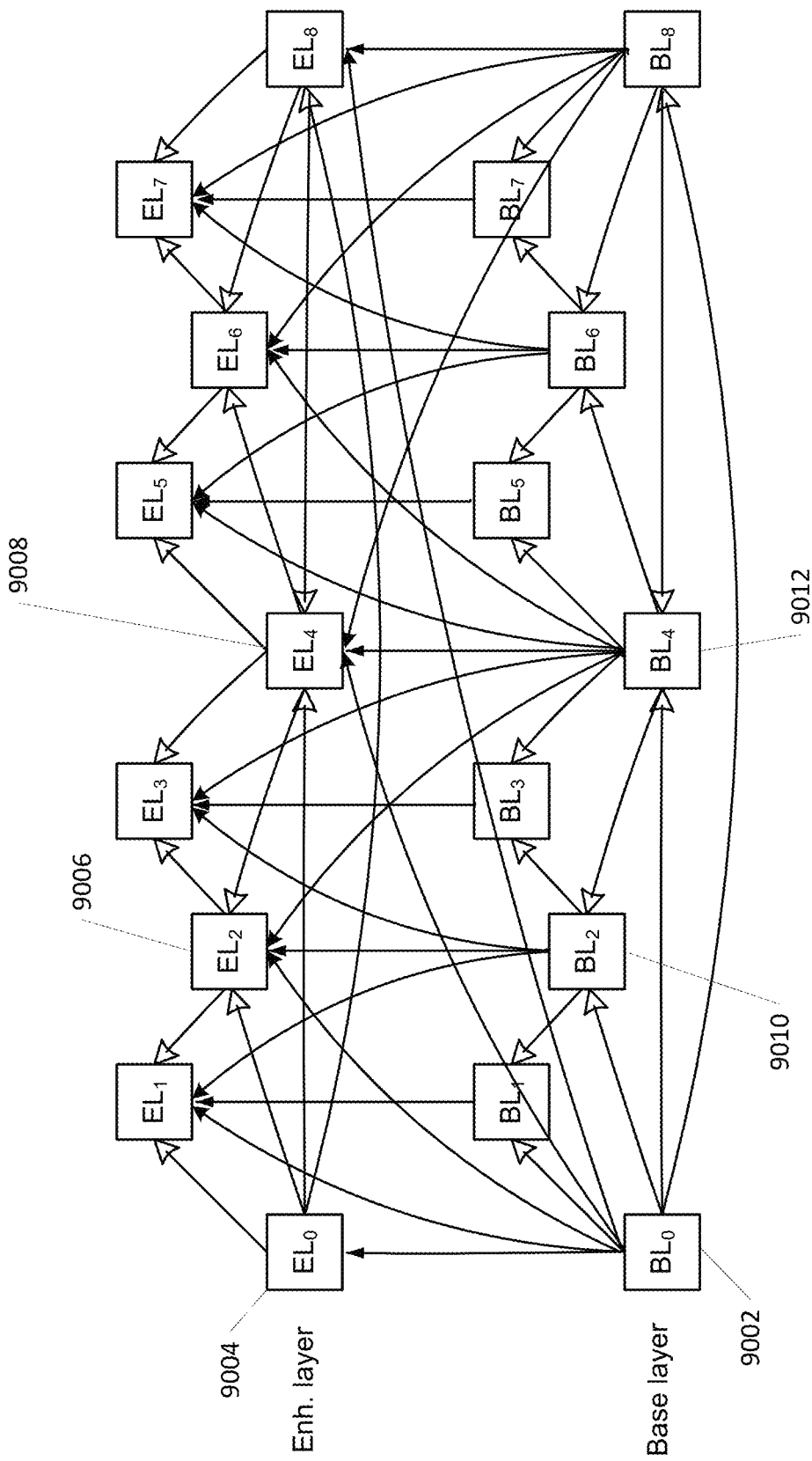
FIG. 9 is a diagram illustrating an example of a two-layer system with temporal prediction and inter-layer prediction enabled for enhancement layer coding.

The ILP processing and management unit may manage the processed reference pictures and may decide (e.g., adaptively decide) which of the reference pictures may be used as prediction by the EL encoder. The ILP processing and management unit may determine how many and which of the processed ILP pictures may be used for prediction of the current enhancement layer picture. FIG. 9 is a diagram illustrating an example of a two-layer system with temporal prediction and inter-layer prediction enabled for enhancement layer coding. For temporal prediction, the prediction structure in FIG. 9 may be referred to as the hierarchical B prediction. For an EL picture, its reference pictures may be a combination of reference pictures in the temporal domain, its collocated picture in the BL, and/or the temporal reference pictures of the collocated BL picture. For example, picture EL2 9006 may be predicted from temporal references (e.g., EL0 9004 and/or EL4 9008) and/or inter layer references (BL2 9010, BL0 9002, BL4 9012). The collection of inter layer references (BL2, BL0, BL4) may be processed by the ILP processing and management unit before being used to predict the EL2 picture 9006. As described herein, the ILP processing may process the BL reference pictures into a format that may be suitable for EL (e.g., suitable spatial resolution, bit-depth, etc.), and/or improve the prediction quality of ILP references, for example, by applying de-noising and/or restoration on the base layer pictures.

The processed ILP reference pictures may provide effective prediction signals. To choose from more references in the enhancement layer may cause problems. For example, at the block level, the signaling overhead to indicate which reference picture(s) may be selected to obtain prediction signal(s) may increase. The encoding complexity may also increase as motion estimation over an extended set of reference pictures may be performed. The reference picture selection and management may provide efficient scalable coding without increase in complexity.

Figure 10:
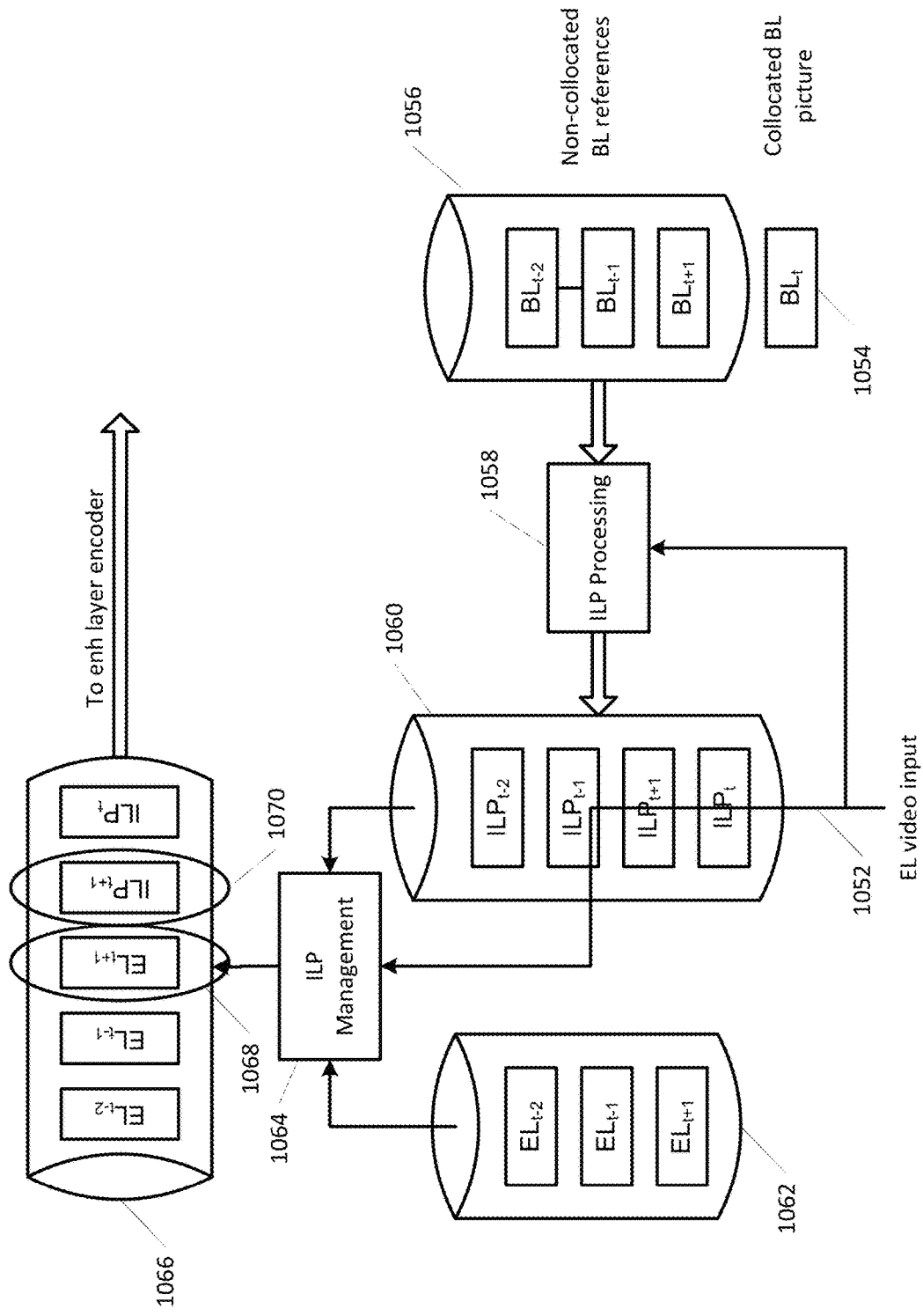
FIG. 10 is a diagram illustrating an example of an ILP processing and management unit.

FIG. 10 is a diagram of an example ILP processing and management unit. At time instance "t", the base layer collocated picture BLt 1054 with its reference pictures BLt−1, BLt−2 and BLt+1 from the BL DPB 1056, may be processed to become ILPt, ILPt−1, ILPt−2, ILPt+1. These ILP references with the temporal references ELt−1, ELt−2, and ELt+1, may be examined by the ILP management unit 1064. A subset may be selected. In the example of FIG. 10, the selected reference pictures may include non-collocated inter-layer reference pictures (for example, ILPt+1 1070). For further example, the selected reference pictures may include more than one reference pictures that may correspond to the same time instance (for example, ILPt+1 1070 and ELt+1 1068).

For example, the ILP management unit 1064 may perform a motion estimation (for example, integer pixel motion estimation) between a current EL picture, ELt, and one or more of the references in the combined set of temporal and inter-layer references (ELt−1, ELt−2, ELt+1, ILPt, ILPt−1, ILPt−2, ILPt+1). The ILP management unit 1014 may collect the motion estimation distortion (for example, Sum of Squared Error, Mean Squared Error, and/or Sum of Absolute Transform Distortion) between the current picture and one or more of the reference pictures examined. The ILP management unit 1064 may select a subset of reference pictures that results in motion estimation distortion lower than a predefined threshold. The ILP processing and management unit 1064 may select a subset of reference pictures in the order of increasing distortion until a predefined number of references have been selected. Multi-pass encoding may be used to carry out the ILP management operations. For example, a first encoding pass may be used to obtain video coding statistics suitable for selecting the subset of reference pictures, and one or more subsequent encoding passes may be used to code the current EL picture, until the coding performance (for example, in terms of its rate distortion characteristics) may be deemed to be satisfactory. As illustrated in FIG. 10, the ILP management unit 1064 may take the enhancement layer video as one of its inputs when determining which reference pictures to use.

Performing picture-level ILP may allow the underlying low-level encoding and decoding logics to remain substantially the same as those used in a single-layer non-scalable system. For example, as illustrated in FIG. 7, the enhancement layer encoder (e.g., an HEVC encoder) may operate in substantially the same way as the base layer encoder (e.g., HEVC encoder) with the possible exception of minimal re-configuration at the picture or slice level (for example, to include inter-layer reference pictures). The ILP processing and management unit may enable scalable coding. The ILP processing and management unit may operate as additional blocks in the system. Such characteristics may be very desirable for many applications since the single-layer encoder and decoder design can be maximally reused, thus reducing implementation complexity significantly.

Figure 8:
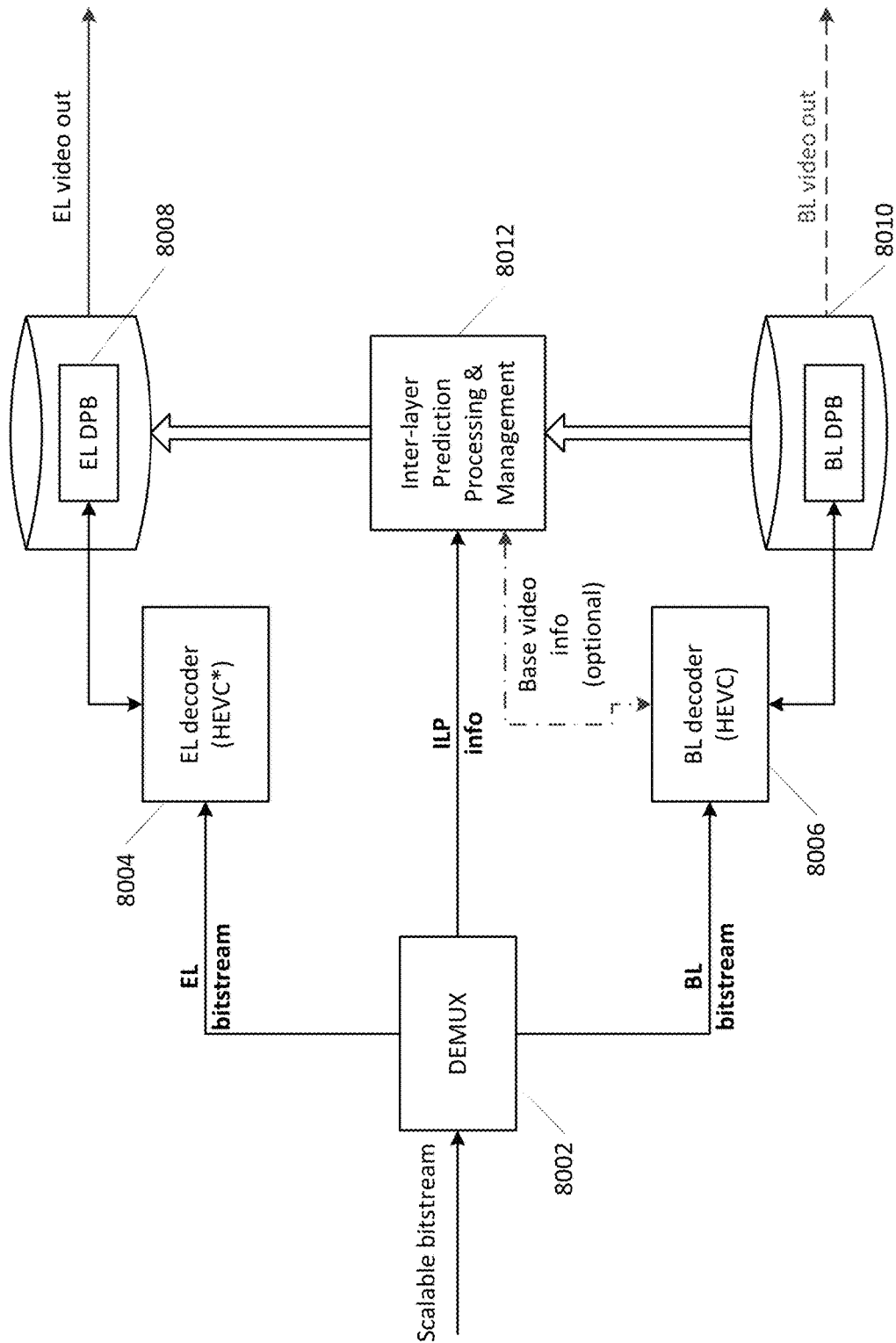
FIG. 8 is a diagram illustrating an example of a two-layer scalable decoding system with picture-level ILP support.

The EL encoder 7004 in FIG. 7 may signal various parameters used during ILP processing and ILP management for the EL decoder 8004 in FIG. 8 to be able to construct and to use the same inter-layer references. Such information, referred to herein as ILP information, may be sent as part of the scalable bitstream. As illustrated in FIG. 7, the ILP processing and management unit 7012 may packetize the ILP information separately from the packets containing coded video data of the BL and EL video. The ILP information may be sent separately from the video packets to implement the ILP processing and management unit in a stand-alone manner and to reduce implementation complexity. For example, in HEVC and H.264, Network Abstraction Layer (NAL) units may be used as packetization units. For scalable systems using HEVC and H.264 as the underlying single-layer codecs, the ILP processing and management unit may send the ILP information in separate NAL units. In FIG. 7, e.g., the MUX 7014 may multiplex NAL units carrying ILP information with the EL bitstream and the BL bitstream. For example, as shown in FIG. 8, the DEMUX unit 8002 may receive a scalable bitstream containing NAL units corresponding to BL coded slices/pictures, EL coded slices/pictures, and ILP information. The DEMUX unit may de-multiplex the bitstream and send the NAL units corresponding to BL coded slices/pictures to the BL decoder, the NAL units corresponding to EL coded slices/pictures to the EL decoder, and the NAL units corresponding to ILP information to the ILP processing and management unit.

Scalable video coding systems may use the Adaptation Parameter Set (APS) in HEVC to convey the ILP information needed by the ILP processing and management unit. The APS packets may be separate NAL units, e.g., with a specific nal_unit_type. The APS NAL units may include coding parameters used in single layer coding, e.g., Adaptive Loop Filtering (ALF) parameters and/or deblocking filter parameters. Each APS NAL unit may be assigned an aps_id, which may be used by a coded slice to identify from which APS to obtain these coding parameters. The APS syntax in HEVC may contain a one-bit flag aps_extension_flag. For example, when the aps_extension_flag is set to 1, additional APS data may follow. The scalable system disclosed herein may carry the ILP information as part of the APS extension. ILP information may include the ILP processing parameters (e.g., upsampling filters if spatial scalability is enabled, disparity compensation parameters if view scalability is enabled, inverse tone mapping parameters if bit depth scalability is enabled, etc.). The ILP information may include the ILP management parameters. The ILP management parameters may specify a subset of temporal references and/or inter-layer references to predict the current EL picture, may be combined with other reference picture signaling. The ILP management parameter may not be part of the APS extension, and may be signaled as part of the slice segment header.

Inter layer processing may retrieve the reconstructed texture from the base layer DPB and apply advanced filtering techniques, and may rely on certain mode and motion information from the base layer bitstream during inter-layer processing, for example in order to improve coding efficiency in the enhancement layer. ILP may utilize base layer information beyond reconstructed texture data from the BL DPB. An Intra Mode Dependent Directional Filter (IMDDF) may be provided. For example, intra prediction modes of the intra coded base layer blocks may be used to choose appropriate directional filters to be applied on the base layer reconstructed pictures before using them for inter layer prediction during enhancement layer coding. Motion Field Mapping (MFM) may be provided. Block motion information (e.g., which may include reference picture indexes and motion vectors) from the base layer bitstream may be mapped to form "virtual" motion fields for the ILR pictures. The mapped virtual motion fields may be used to predict the enhancement layer motion, for example, through temporal motion vector prediction (TMVP) supported by HEVC.

Mode and motion information from the base layer bitstreams may or may not be available depending on the specific implementation of the BL decoder. For example, if the scalable decoding system in FIG. 8 uses an ASIC implementation of HEVC as its BL decoder, the BL decoder may not provide mode and motion information to the ILP processing and management unit through open application programming interfaces (APIs).

The advanced ILP processing may be disabled when the additional mode and motion information (e.g., as illustrated in FIG. 8 by dash-and-dot line) from the base layer is not available.

Standard scalability may allow the BL codec and the EL codec, for example the codecs of FIG. 7 and FIG. 8, to be different codecs. For example, the BL codec may use the H.264/AVC standard and the EL codec may use the HEVC standard. When the BL and EL codecs are different, certain information that may be useful for the EL codec may not automatically exist in the BL codec. For example, the HEVC standard may utilize Reference Picture Sets (RPS) to achieve DPB management. In the H.264/AVC standard functionality similar to RPS may be provided by a combination of sliding window DPB management and Memory Management Command Options (MMCO). If the EL codec performs inter layer RPS prediction, for example according to one or more of the implementations described herein, and if the BL codec does not produce the RPS information because it may be based on H.264/AVC, inter layer RPS prediction may not be applied in a straightforward manner. In some cases, one or more types of information useful for the EL codec may not be available, e.g., if the BL codec uses a different standard than the EL codec.

For example, a base layer (BL) video bitstream information may not be made available due to implementation constraints and/or may not be in a suitable format to be used for efficient EL video coding. Implementations described herein may include an enhanced ILP processing and management unit. The enhanced ILP unit may perform additional functions to improve coding efficiency and/or to provide maximal design flexibility to the scalable coding system.

An enhanced ILP unit may be provided. The enhanced ILP unit may be utilized to overcome restrictions (e.g., implementation restrictions) without reducing scalable coding efficiency. The enhanced ILP unit may process the reference pictures stored in the BL DPB into a format that may be suitable for prediction of the enhancement layer video. The enhanced ILP unit may manage the processed reference pictures and/or decide (e.g., adaptively decide) which of the processed pictures are to be used as prediction for the EL video by the EL encoder. The enhanced ILP unit may extract mode and motion information from the base layer bitstreams that may be utilized for inter layer prediction. For example, the enhanced ILP unit may use the extracted mode and motion information to process the reference pictures stored in the BL DPB into a format that may be suitable for prediction of the enhancement layer video. The enhanced ILP unit may translate information from the base layer bitstream, for example, into a suitable format to be used in enhancement layer coding. For example, the enhanced ILP unit may translate sliding window DPB management and MMCO used in an H.264/AVC BL codec into RPS to be used by an HEVC codec in the EL.

Figure 12:
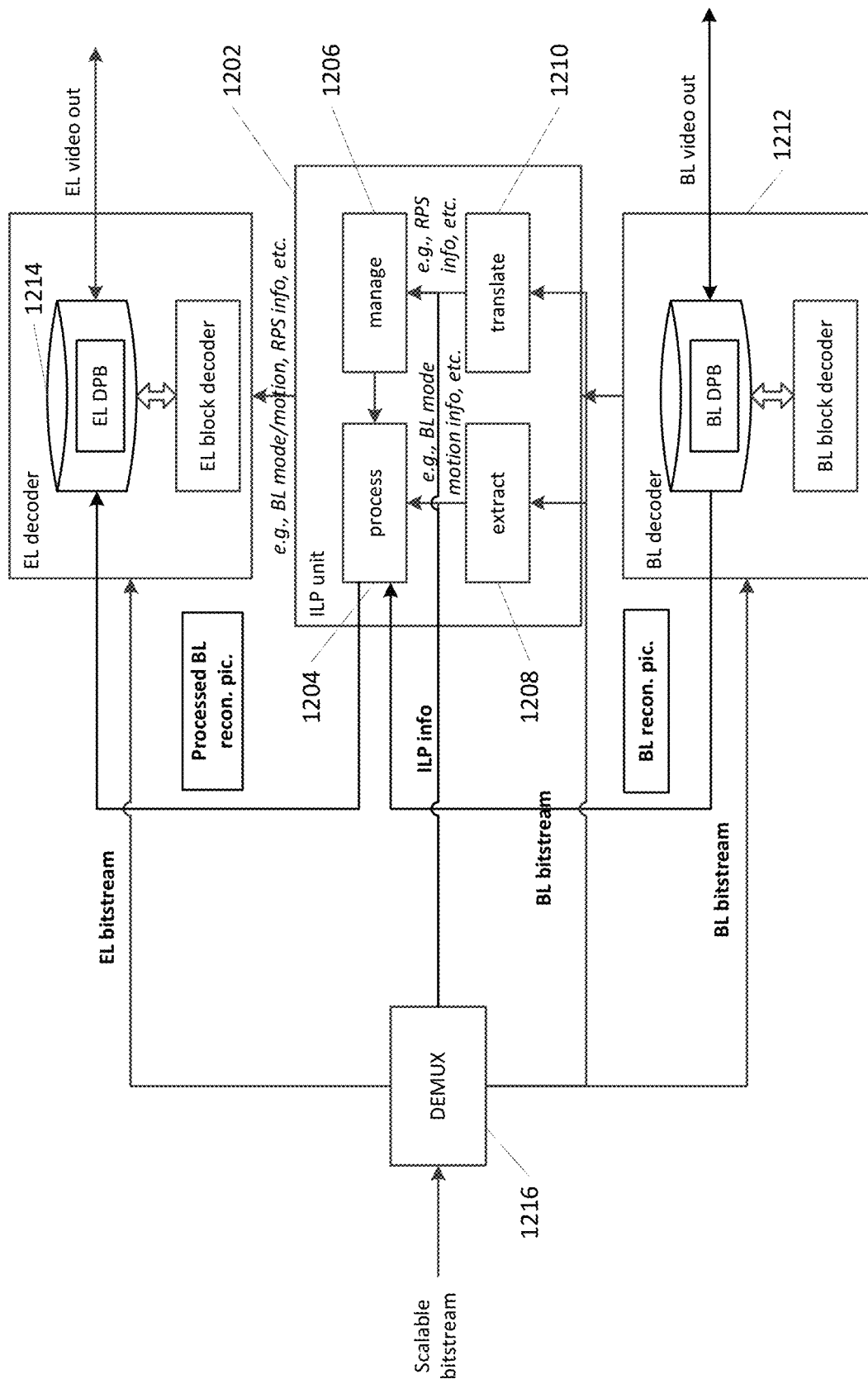
FIG. 12 is a diagram illustrating an example of a scalable coding system that may use an enhanced ILP processing and management unit.

FIG. 12 is a diagram illustrating an example of a scalable decoding system that may use an enhanced ILP unit 1202. As illustrated in the FIG. 12, the enhanced ILP unit 1202 may perform one or more functions, including for example process, manage, extract, or translate information. The enhanced ILP unit 1202 may utilize a BL reconstructed picture and apply inter layer processing techniques according to the ILP info provided by the bitstream de-multiplexer (DEMUX) to produce a processed BL reconstructed picture. If the BL decoder 1212 cannot provide information utilized for inter-layer processing (e.g., the BL decoder 1212 provides reconstructed BL pictures but not the mode and motion information of the BL bitstream), the enhanced ILP unit 1202 may derive the information (e.g., via the extract function of the enhanced ILP unit, for example, as described herein). One or more processed BL reconstructed pictures may be inserted into the EL DPB 1214 for enhancement layer coding.

The enhanced ILP unit 1202 may utilize ILP information provided by a DEMUX 1216 and may determine which of the one or more of the processed BL reconstructed pictures may be inserted into the EL DPB 1214. The enhanced ILP unit may determine the order of the processed BL reconstructed pictures. The BL information may not be in the appropriate format for the enhanced ILP unit (e.g., for the manage function of the enhanced ILP unit). For example, the BL information may not be in the appropriate format if the BL bitstream is coded using a standard different from the one used by the EL codec. If the BL information is not in the appropriate format for the enhanced ILP unit 1202, the enhanced ILP unit 1202 may reformat and/or translate the BL information into the appropriate format (e.g., via the translate function of the enhanced ILP unit 1202, for example, as described herein). As illustrated by example in FIG. 5, the enhanced ILP unit 1202 may utilize the translated BL information to perform appropriate reference picture buffer management.

The enhanced ILP unit 1202 may extract BL information. For example, if BL video information could be utilized by the enhanced ILP unit (e.g., for the process function of the enhanced ILP unit) but is not available from the BL decoder, then the enhanced ILP unit may parse the BL bitstream and extract the information (e.g., such as but not limited to BL mode and motion information). The parsed and extracted information may be used by the enhanced ILP unit (e.g., by the process function of the enhanced ILP unit). For example, BL mode information may include, but is not limited to, whether base layer blocks are inter or intra coded, the directional intra prediction modes for intra coded base layer blocks, etc. BL motion information may include, but is not limited to, the base layer block partitions, the base layer block prediction direction information (e.g., uni-prediction or bi-prediction), the base layer block motion vectors, the base layer block reference picture indices, etc.

The enhanced ILP unit may translate BL information. For example, if BL video information is not in the suitable format to be used by enhancement layer coding, then the enhanced ILP unit may reformat and translate the BL video information into a format suitable for use for enhancement layer coding. For example, the enhanced ILP unit may reformat and translate BL information when the scalable system (e.g., those exemplified in FIG. 7 and FIG. 8) utilizes different BL and EL codecs. When hybrid codecs are used in the scalable system, the enhanced ILP unit may translate and prepare information from the BL codec into a suitable format to be used by the EL codec. For example, DPB management information based on sliding window and MMCO commands from an H.264/AVC base layer codec may be translated into RPS for EL coding when the enhancement layer codec uses HEVC. The enhanced ILP unit may reformat and translate BL information from any BL codec into usable information by any enhancement layer codec. As illustrated in FIG. 12, the outputs of the enhanced ILP unit may include, e.g., the processed BL pictures that may be inserted into an EL Decoded Picture Buffer (DPB) 1214 for efficient inter-layer prediction. The enhanced ILP unit may output BL mode and motion information, translated RPS information, etc.

The enhanced ILP unit 1202 may provide information that may be utilized to achieve efficient scalable video coding, for example when such additional information is not readily available from the base layer codec. The enhanced ILP unit 1202 may be designed to maximize use of single layer codec implementations. The enhanced ILP unit 1202 may provide a seamless and efficient interface between a BL codec and an EL codec, for example by absorbing functions that single layer codec implementation may not perform. For example, the enhanced ILP unit 1202 may allow for efficient scalable coding without affecting the lower level functions of the base and enhancement layer codecs (e.g., intra prediction, inter prediction, transformation, quantization, inverse transformation, inverse quantization, loop filtering, block reconstruction, etc.). The enhanced ILP unit 1202 may be used within a scalable system that has high coding efficiency and can support hybrid codec architecture (e.g., the base layer encoder and/or decoder and enhancement layer encoder and/or decoder may utilize different codecs). The enhanced ILP unit may reduce implementation cost and maintain scalable coding efficiency.

Referring to FIG. 3 and FIG. 4, block-level ILP may be used to further improve scalable coding performance. Although block-level ILP may require the enhancement layer encoder and decoder to have underlying logics different from those of the base layer encoder and decoder (for example, in the form of additional coding modes, additional contexts for arithmetic coding, etc.), block-level ILP may allow the encoder to choose from an extended set of operation modes based on rate distortion considerations. The additional choices may be manifested in the form of higher scalable coding performance. For example, video coding standards may be hybrid block-based video coding systems with block diagrams shown in FIG. 5 and FIG. 6.

In the case of HEVC, the video blocks may be referred to as prediction unit (PU) when used for prediction, coded tree block (CTB) when used as coding units, and transform unit (TU) when used for transform and inverse transform. The HEVC may use quadtree (QT) based partitioning. Since the base layer and the enhancement layer video signals may be correlated, corresponding block coding modes and sizes (including, but not limited to, PU, TU and CTB) may be correlated. Such correlation may be used by the enhancement layer encoder and decoder to improve coding of the QT splitting, PU, TU and CTB modes and/or sizes in the enhancement layer. This may reduce signaling overhead. When spatial scalability is enabled between the two layers, block size adjustment may be applied first. For example, if the EL video and the BL video are in 2:1 spatial ratio (e.g., EL video is twice as large in each dimension), then base layer PU, TU and CTB sizes may be multiplied by a factor of two in each dimension before being used to predict the enhancement layer block sizes. The base layer block modes and/or sizes may be used as additional binary arithmetic coder's contexts to code the enhancement layer block modes and/or sizes. The video coding systems may assign the derived information (e.g. modes and/or sizes) of the blocks (e.g., a PU, a TU, or a CTB) to a picture-level inter-layer reference picture. The video coding device may use these derived information of the blocks to predict a block at a layer e.g., the EL layer.

Figure 11:
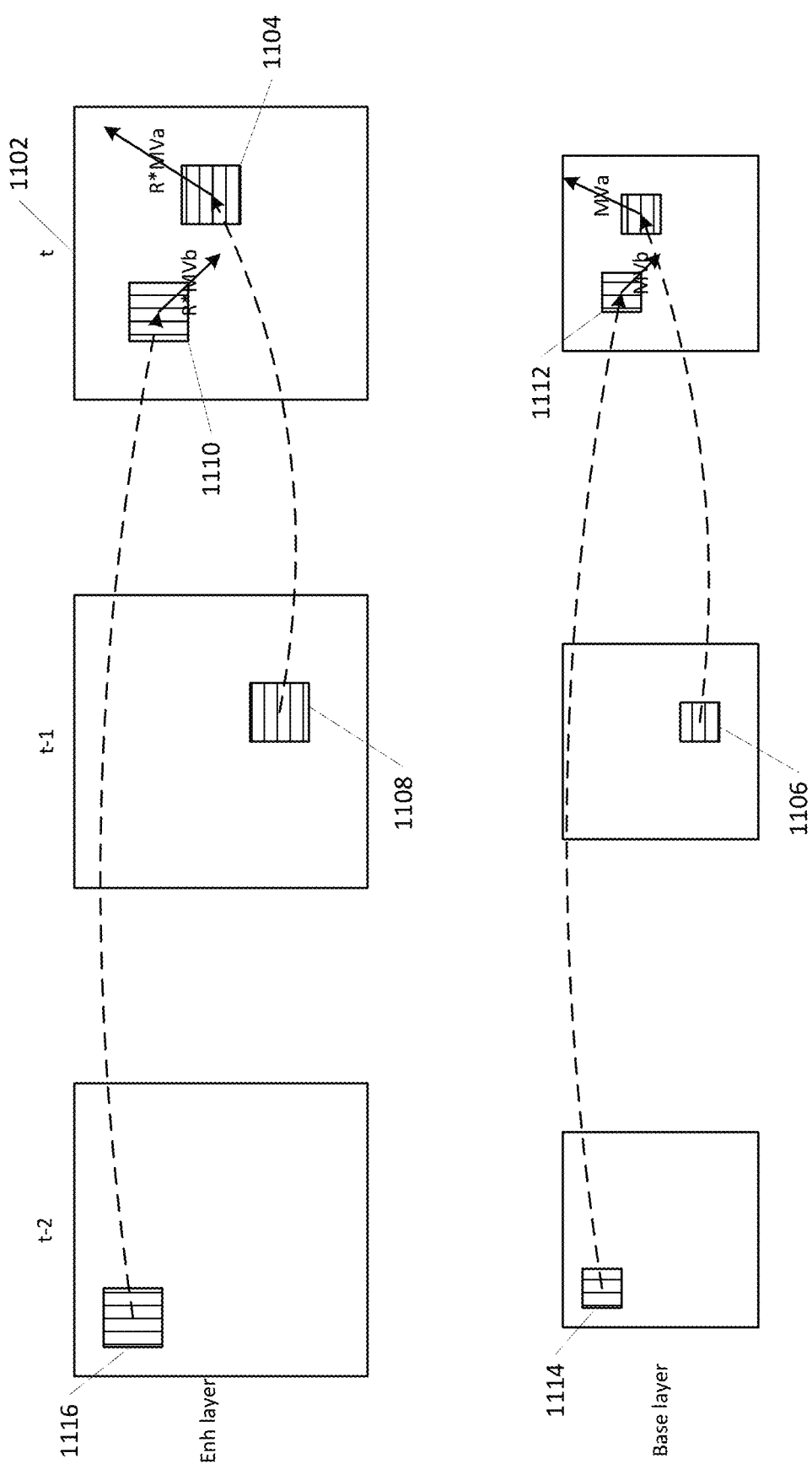
FIG. 11 illustrates an example prediction structure using inter-layer motion vector prediction.

When motion compensated prediction is enabled for a base layer and enhancement layer picture and/or slice at the same time instance t, the motion vectors from the base layer may be used to predict the motion vectors in the enhancement layer. For example, when spatial scalability is enabled, the motion vectors from the base layer may be scaled appropriately. For example, as illustrated by example in FIG. 11, at time instance t in the BL 1102, the horizontally hashed block 1104 may be predicted from the BL reference at time instance (t−1) with motion vector MVa 1106. The scaled horizontally hashed block in the EL, if predicted from the EL reference at time instance (t−1) 1108, may have a motion vector whose values are close to R*MVa, where R may be the spatial scaling ratio. For the vertically hashed block 1110 in the EL, the corresponding base layer vertically hashed block 1112 may be predicted from time instance (t−2) 1114 with motion vector MVb. The scaled vertically hashed block in the EL, if predicted from the EL reference at time instance (t−2) 1116, may have a motion vector whose values are substantially close to R*MVb. When view scalability is enabled, the motion vectors from the base layer representing a first view may be warped and/or affined transformed to compensate for view disparity such that they may be maximally correlated with motion vectors in the enhancement layer representing a second view. To take advantage of such strong correlations between inter-layer motion vectors, the scaled based layer motion vectors (or warped/transformed motion vectors in case of view scalability) may be used as motion vector predictors to reduce enhancement layer motion vector coding bits.

Block-level inter layer prediction may involve predicting the residual signal in the enhancement layer from base layer residual. For example, residual prediction may be performed where block residual from a base layer (for example, after being upsampled to appropriate dimensions if needed) may be subtracted from the enhancement layer residual to further reduce enhancement layer residual energy and the number of bits required to code it. Block level inter-layer prediction techniques may be used to code the EL texture (for example, pixel values) in manners similar to those used in SVC. In the scalable system discussed above, texture prediction may be provided in the form of picture level ILP.

A scalable architecture (e.g., a flexible scalable architecture) for multi-layer video coding may be re-configured to support any of the different types of scalabilities listed in Table 1. For example, one operation mode may focus on picture level ILP. For example, an ILP processing and management unit may process base layer reference pictures such that the base layer reference pictures sets may be in suitable format and may provide accurate and effective prediction signal for enhancement layer video coding. For example, an ILP processing and management unit may select a subset from the combination of temporal references and processed inter-layer references to achieve any favorable rate, distortion, and/or computational complexity trade-offs. For example, an ILP processing and management unit may packetize ILP information into separate NAL units such that inter-layer prediction operations may be performed with minimal interference with the base and enhancement layer encoder and decoder operations. The inclusion of picture-level ILP may reduce implementation complexity by allowing the scalable system to maximally reuse single-layer encoder and decoder logics at the base and enhancement layers.

Figure 13A:
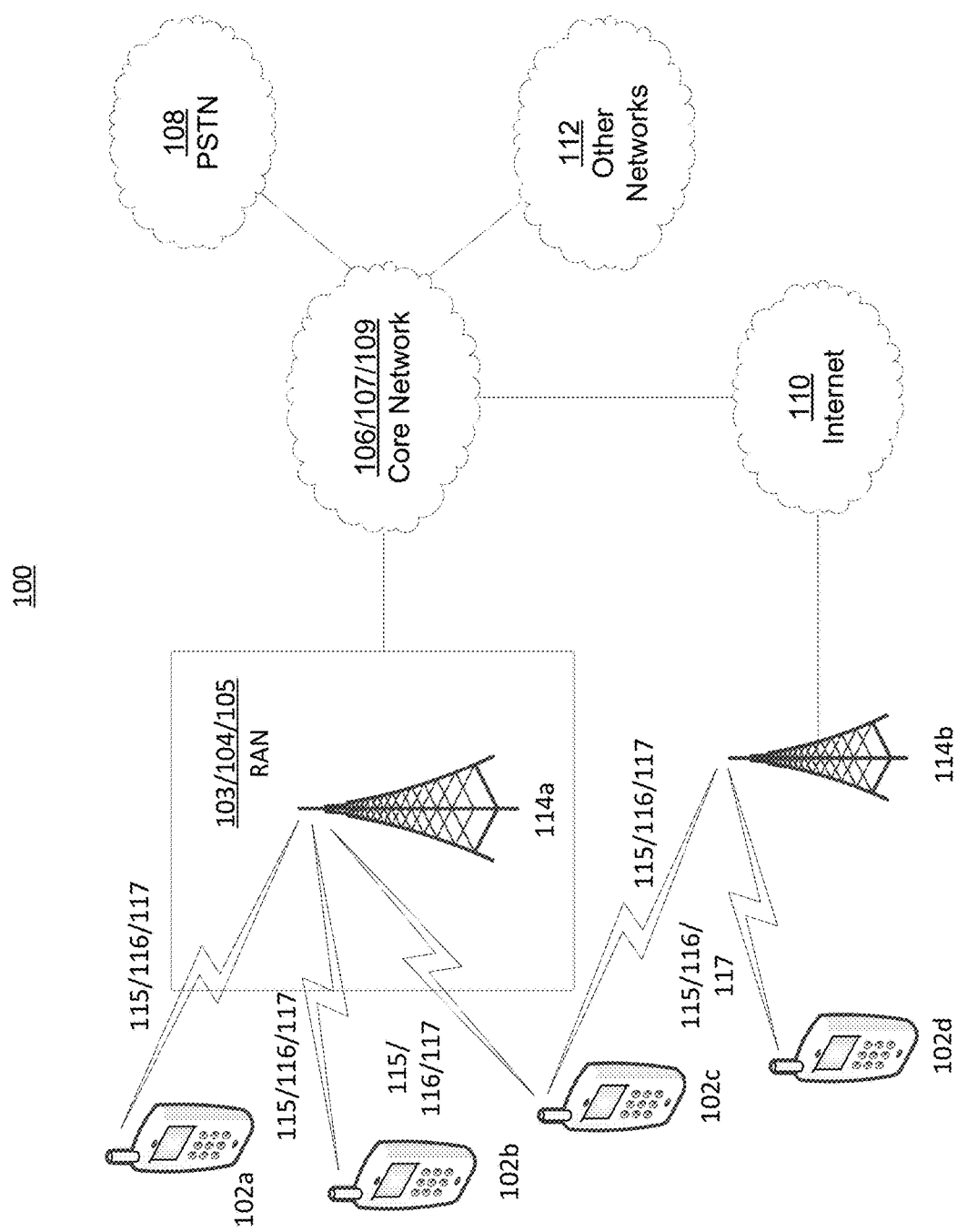
FIG. 13A is a system diagram of an example communications system in which one or more disclosed embodiments may be implemented.

FIG. 13A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
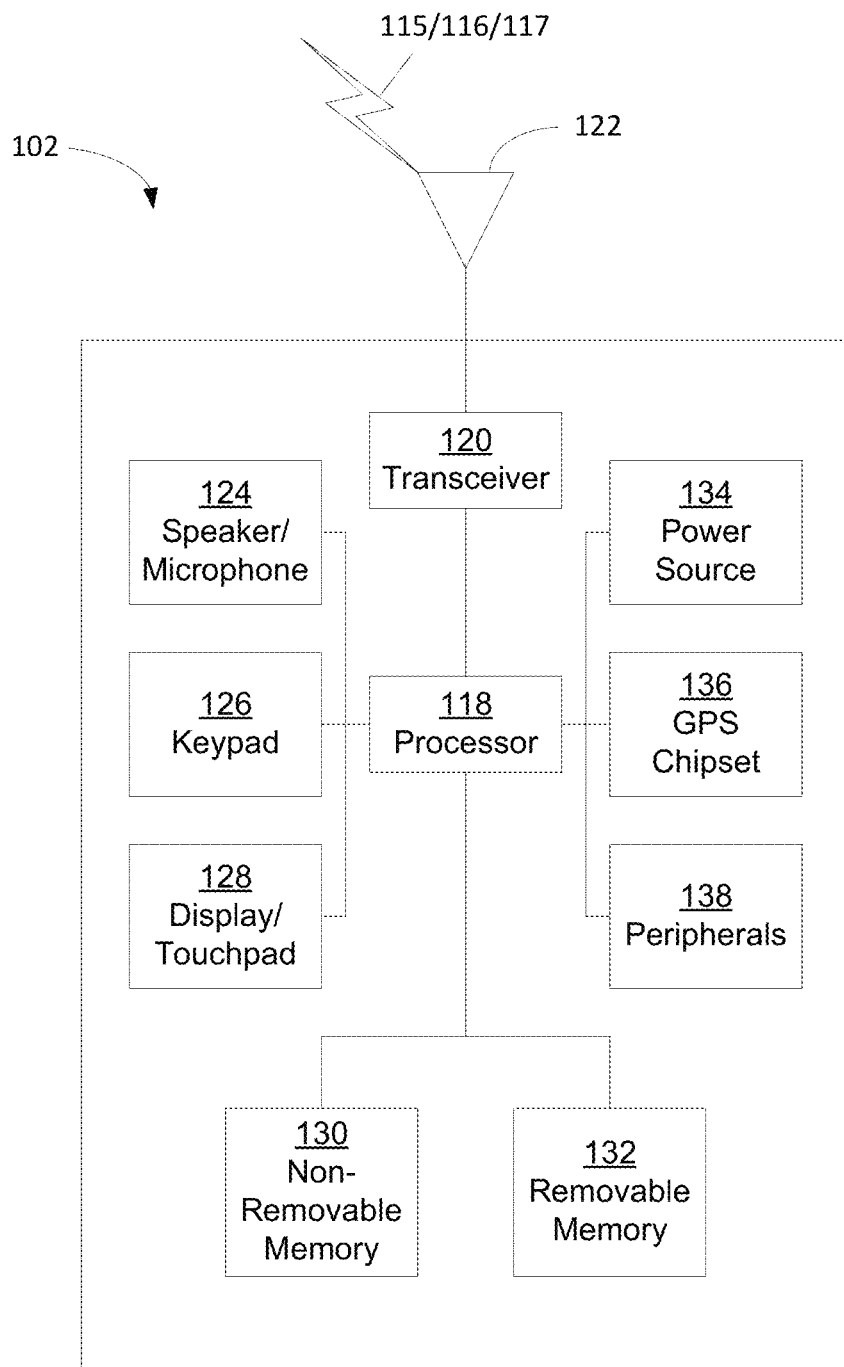
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
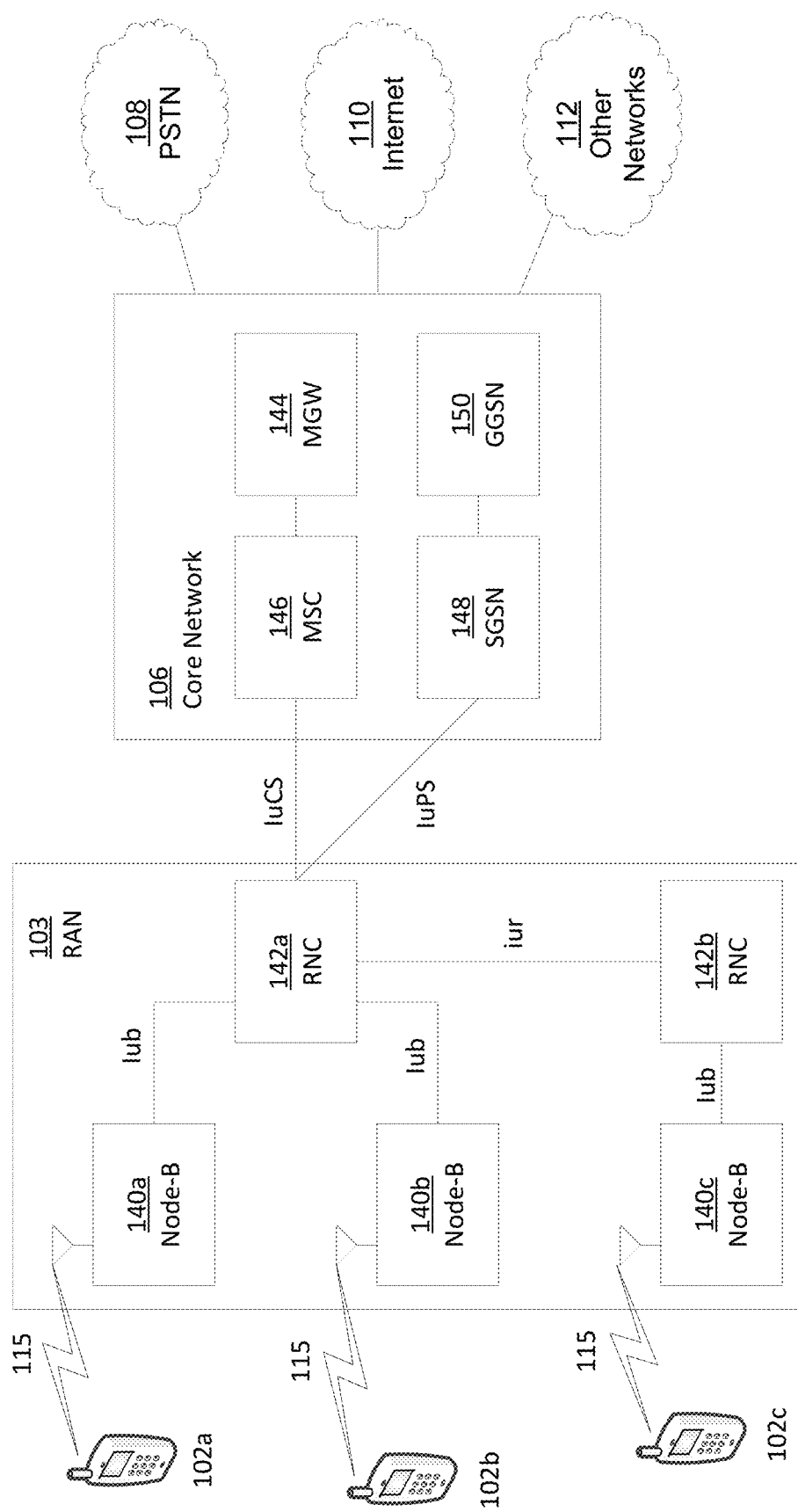
FIG. 13C is a system diagram of an example radio access network and an example core network that may be used within the communications system illustrated in FIG. 13A.

FIG. 13C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
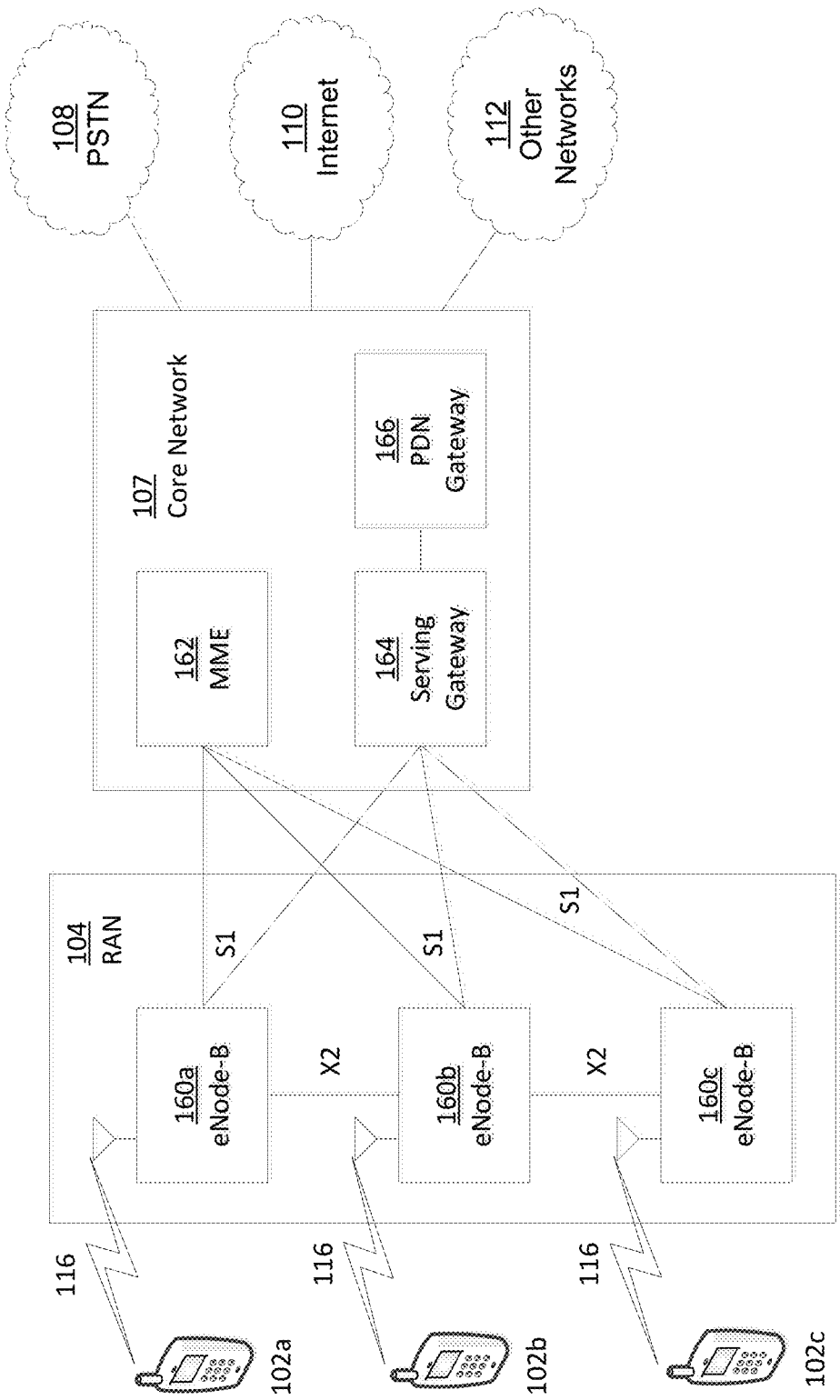
FIG. 13D is a system diagram of another example radio access network and another example core network that may be used within the communications system illustrated in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
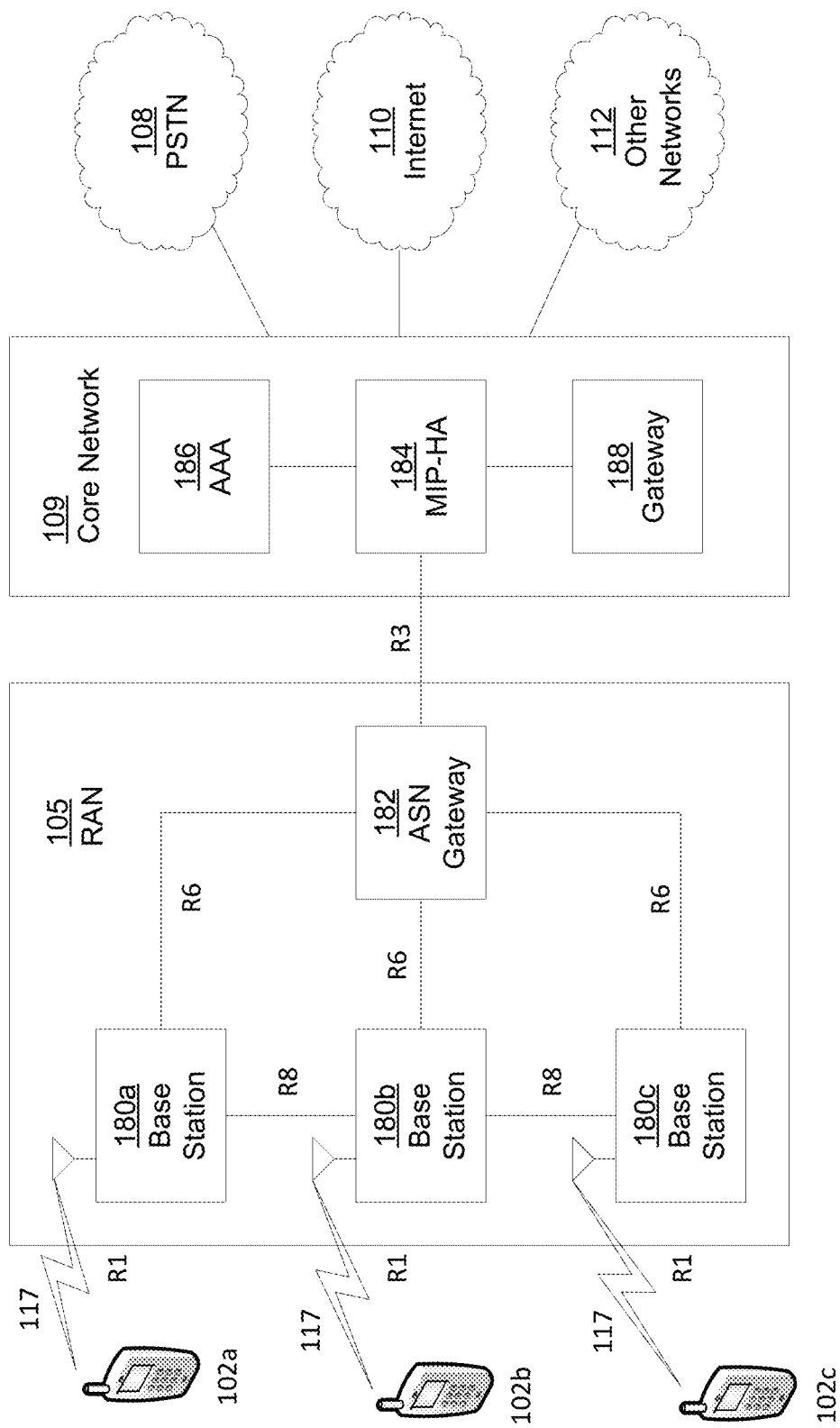
FIG. 13E is a system diagram of another example radio access network and another example core network that may be used within the communications system illustrated in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

One of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Although described using a 2-layer scalable system, a person skilled in the art may extend the architecture discussed herein to multi-layer scalable video coding systems. Additionally, although HEVC was often used as an exemplar single-layer codec, the system may have little dependency on the underlying single-layer video codec itself, and may be combined with any other single-layer codecs. One of ordinary skill in the art will appreciate that each feature or element can be used alone or in any combination with the other features and elements.

The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method comprising:
   receiving a video signal comprising a base layer (BL) and an enhancement layer (EL);
   reconstructing a BL picture from the BL;
   determining motion information for the BL picture;
   performing picture level inter-layer processing on the BL picture to generate an inter-layer reference picture;
   deriving, using the motion information for the BL picture, motion information for the inter-layer reference picture; and
   predicting an EL picture using the inter-layer reference picture and the motion information for the inter-layer reference picture.

2. The method of claim 1, wherein determining motion information for the BL picture comprises determining indexes and motion vectors.

3. The method of claim 2, wherein deriving, using the motion information for the BL picture, motion information for the inter-layer reference picture comprises determining indexes and motion vectors for the inter-layer reference picture.

4. The method of claim 2, wherein deriving motion information for the inter-layer reference picture comprises scaling a motion vector for the BL picture to generate a motion vector for use with the inter-layer reference picture.

5. The method of claim 1, wherein predicting an EL picture using the inter-layer reference picture and the motion information for the inter-layer reference picture comprises predicting the EL picture using temporal motion vector prediction.

6. The method of claim 1, wherein predicting an EL picture comprises predicting enhancement layer motion information for the EL picture based on the motion information for the inter-layer reference picture.

7. The method of claim 1, further comprising:
storing the motion information for the inter-layer reference picture with the inter-layer reference picture.

8. The method of claim 7, wherein storing the motion information for the inter-layer reference picture with the inter-layer reference picture comprises storing the motion information for the inter-layer reference picture in an enhancement layer decoded picture buffer.

9. The method of claim 1, wherein determining motion information for the BL picture comprises determining at least one of: block partitions; direction information; motion vectors; or reference picture indices.

10. The method of claim 9, wherein the direction information comprises information identifying one or more of uni-prediction information and bi-prediction information.

11. The method of claim 1, further comprising:
determining mode information for the BL picture;
determining, based on the mode information, directional filters to be applied to the BL picture; and
applying the determined directional filters to the BL picture to generate a filtered BL picture,
wherein performing picture level inter-layer processing on the BL picture to generate an inter-layer reference picture comprises performing picture level inter-layer processing on the filtered BL picture.

12. A system comprising:
a processor configured to:
receive a video signal comprising a base layer (BL) and an enhancement layer (EL);
reconstruct a BL picture from the BL;
determine motion information for the BL picture;
perform picture level inter-layer processing on the BL picture to generate an inter-layer reference picture;
derive, using the motion information for the BL picture, motion information for the inter-layer reference picture; and
predict an EL picture using the inter-layer reference picture and the motion information for the inter-layer reference picture.

13. The system of claim 12, wherein determining motion information for the BL picture comprises determining indexes and motion vectors.

14. The system of claim 13, wherein deriving, using the motion information for the BL picture, motion information for the inter-layer reference picture comprises determining indexes and motion vectors for the inter-layer reference picture.

15. The system of claim 13, wherein deriving motion information for the inter-layer reference picture comprises scaling a motion vector for the BL picture to generate a motion vector for use with the inter-layer reference picture.

16. The system of claim 12, wherein predicting an EL picture using the inter-layer reference picture and the motion information for the inter-layer reference picture comprises predicting the EL picture using temporal motion vector prediction.

17. The system of claim 12, wherein predicting an EL picture comprises predicting enhancement layer motion information for the EL picture based on the motion information for the inter-layer reference picture.

18. The system of claim 12, wherein the processor is further configured to:
store the motion information for the inter-layer reference picture with the inter-layer reference picture.

19. The system of claim 18, wherein storing the motion information for the inter-layer reference picture with the inter-layer reference picture comprises storing the motion information for the inter-layer reference picture in an enhancement layer decoded picture buffer.

20. The system of claim 12, wherein determining motion information for the BL picture comprises determining at least one of: block partitions; direction information; motion vectors; or reference picture indices.

21. The system of claim 20, wherein the direction information comprises information identifying one or more of uni-prediction information and bi-prediction information.

22. The system of claim 12, wherein the processor is further configured to:
determine mode information for the BL picture;
determine, based on the mode information, directional filters to be applied to the BL picture; and
apply the determined directional filters to the BL picture to generate a filtered BL picture,
wherein performing picture level inter-layer processing on the BL picture to generate an inter-layer reference picture comprises performing picture level inter-layer processing on the filtered BL picture.

* * * * *